United States Patent [19]

Stamm

[11] 3,712,706
[45] Jan. 23, 1973

[54] RETROREFLECTIVE SURFACE
[75] Inventor: Robert Franz Stamm, Stamford, Conn.
[73] Assignee: American Cyanamid Company, Stamford, Conn.
[22] Filed: Jan. 4, 1971
[21] Appl. No.: 103,543

[52] U.S. Cl. ............... 350/103, 350/129, 350/162 R
[51] Int. Cl. .............................................. G02b 5/12
[58] Field of Search ............... 350/97–109, 162 R, 350/286, 287, 129; 94/1.5

[56] References Cited

UNITED STATES PATENTS

| 1,874,138 | 8/1932 | Stimson | 350/103 |
| 3,469,898 | 9/1969 | Altman | 350/105 |
| 1,743,835 | 1/1930 | Stimson | 350/103 |

*Primary Examiner*—David Schonberg
*Assistant Examiner*—Michael J. Tokar
*Attorney*—Gordon L. Hart

[57] ABSTRACT

A retroreflector of unusually high retroreflective efficiency comprises an array of cube corner reflectors arranged as shown in FIG. 1. The cube corners are made so extremely accurately and of such small size teat diffraction is the predominant factor governing the divergence from perfect retroreflection of the reflected light. The retroreflectors have various uses and are particularly efficient reflectors for highway signs and markers.

16 Claims, 14 Drawing Figures

INVENTOR.
ROBERT FRANZ STAMM

BY

ATTORNEY

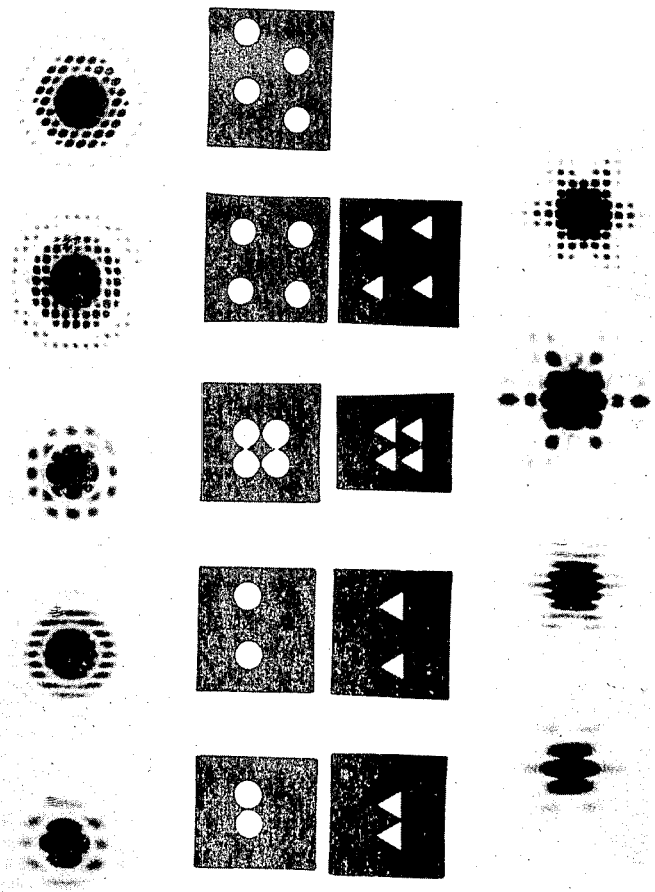
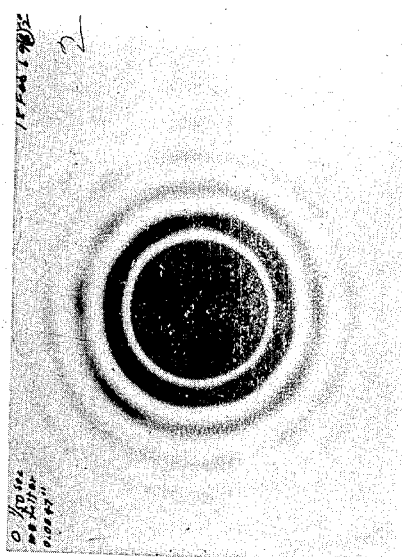
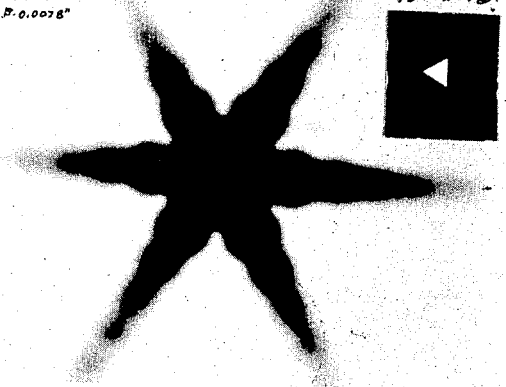

DIFFRACTION PATTERN OF GRID IN FIG. 7B

INVENTOR.
ROBERT FRANZ STAMM

BY
ATTORNEY

RETROREFLECTIVE SURFACE

The invention relates to optical reflector sheets of high retroreflective efficiency. Various embodiments of the invention will find utility as reflectors for several kinds of applications, but in particular, preferred embodiments are especially designed for use in highway reflectors intended to reflect illumination received from headlamps of automobiles back to the driver of the same automobile with high reflective efficiency.

The most efficient reflective sheet for this use that is presently in widespread use employs an array of randomly oriented transparent glass spheres fixed in a transparent plastic front sheet with a thin backing layer of plastic separating each sphere from a spherical mirror reflector located behind each sphere.

A perfect retroreflector would return all of the incident light directly along the axis of retroreflection to the source and would be impractical for the present intended use because the viewer's eye is at a point away from the axis of retroreflection. All retroreflectors are imperfect, to varying degrees, so the reflected light tends to diverge from the axis of retroreflection. The degree of such divergence is critical to the present invention which requires enough divergence to include the observer's eye within the cone of diverging light and yet not so much divergence that the intensity of the reflected light at the observer's eye is unduly diminished.

For a reflector of the kind mentioned above, made with 80 micron diameter spheres and obtained by purchase in ordinary commerce, it was determined by measurement that the total light retroreflected within a cone of half angle 0.104 radian (6°) diverging from the axis of retroreflection was about 23.6 percent of the total incident light received at the reflector. Accordingly, it was determined that this efficiency or better would have to be one objective to be provided by a retroreflective sheet according to the invention.

Another object of the invention is to provide a retroreflector that could be made as a thin sheet preferably flexible and that would be amenable to manufacture by mass production techniques.

Retroreflective properties of cube corner (c.c.) reflectors are known and have been utilized in several kinds of applications. For example, a retroreflector comprising an array of 100 c.c. prisms made of fused quartz, having apertures of 1 inch in diameter, and made with near-perfect optical precision was placed on the moon by American astronauts and was used successfully in laser ranging experiments in which a laser beam from a source on earth was retroreflected from the moon back to the source on earth. In more mundane uses, c.c. arrays of several kinds have been used in reflectors for vehicle taillights and the like. U.S. Pat. No. 2,380,447 to Jungersen described a variety of reflective surfaces that could be impressed in thin plastic sheets for a variety of reflecting jobs. That patent included descriptions of two types of close-packed c.c. arrays, including one array in which the c.c. cavity mirrors would have hexagonal windows and another in which the cavities would have triangular windows. The Jungersen patent stated that the array having hexagonal windows would have better reflective efficiency than the array having close-packed triangular windows. That statement probably is true for the vast majority of cases in which the angular divergence of the retroreflected light is attributable almost entirely to optical imperfections. However, contrary to Jungersen's description, I have discovered that when the same close-packed array of c.c. mirrors having triangular windows is made with sufficient precision and within a certain range of very small window sizes and with highly reflective specular mirror surfaces, as will be described in more detail, there is obtained a retroreflector of unexpectedly high reflective efficiency within a narrow cone surrounding the retroreflective axis.

In considering the various types of c.c. arrays that could be employed so as to provide multiple and contiguous retroreflective elements in a thin sheet it was soon determined that the c.c. array with triangular windows would have to be formed with very careful optical precision if high efficiency were to be expected, because even very slight deviation of the dihedral angles formed by adjacent cube walls will cause very substantial loss of light due to escape of light from the c.c. after only single or double reflection of incident beams within the c.c. rather than the triple reflection necessary for retroreflection. Furthermore, the same slight deviations of the dihedral angles from 90° will produce multiple reflected beams from a single input beam and will also cause angular displacements of these reflected beam axes from the true retroreflective axis, which has the effect of spreading or diverging the reflected beam with consequent reduction of illumination at the eye of the viewer. While some divergence of the retroreflected beam is needed, as explained before, such divergence must be carefully contained within a limited small solid angle to achieve the needed efficiency. This means that the 90° dihedral angles of the cube corners must be carefully made within limits that will achieve the needed efficiency of retroreflection.

Another limiting factor in forming cube corners in thin sheet material is the depth of the c.c., and it was observed that the cube corners would have to be of small size to permit embossing or otherwise forming the c.c. array on the surface of a thin sheet.

In contemplating the flat, planer arrays of small cube corners it was recognized that the pattern of line defining the cube corners in any array would cause diffraction of the retroreflected light and that as the c.c. sizes were made even smaller, the diffraction effects would become increasingly noticeable. Very little published information was found describing precisely the diffraction effects that might be expected from the kinds of apertures and line grids that are encountered in such c.c. arrays. At first, it was expected, in accordance with known optical theory that the diffraction pattern of any regularly ordered array of apertures such as that shown in FIG. 1 would contain noticeable destructive interference effects such as those shown in FIG. 8, 15b facing page 400 in "Principles of Optics" by Born & Wolf, MacMillan & Co., N.Y. (1959). While this was found to hold true for monochromatic light, it was also found, quite unexpectedly, that within a workable range of small aperture sizes, the destructive interference patterns essentially disappear when polychromatic, essentially white light is used, so that for practical purposes, a reflector having aperture sizes within that range will not produce the expected objectionable interference and color effects due to diffraction. It was expected that diffraction would cause some angular divergence of the retroreflected light but how much was not known. I had to derive by theory and experimentation a formula for calculating a useful value defining the divergence caused by diffraction as a function of the size of the c.c. window. Also quite unexpectedly, it was found that one particular array, the hexagonal close packed array of cube corners having equilateral triangular windows depicted in FIG. 1, will produce considerably greater angular divergence by diffraction of a retroreflected beam than is produced by any other array of cube corners with triangular windows of the same size.

From the foregoing considerations it was recognized that both diffraction effects and geometrical imperfections of the c.c. dihedral angles would affect the amount of divergence of the retroreflected beam. It was also determined that these two effects would be additive. The divergence will increase as the aperture size is made smaller and divergence will increase as the dihedral angles depart further from perfection. Both of these factors then, to the extent that each affects angular divergence of the retroreflected beam, will affect the intensity of light diverging in a retroreflected beam at any point off-axis corresponding with the observer's eye. A third critical factor affecting intensity of the reflected light at any point on-axis or off-axis is the reflective efficiency of the c.c. faces, and the importance of this factor is appreciated more on considering that the incident beam must be reflected successively by three such faces to achieve retroreflection.

It was determined by consideration together of all the foregoing factors, as will be discussed in more detail, that unexpectedly high retroreflective efficiency for the purpose intended, is obtained by means of a retroreflector consisting essentially of a hexagonal close-packed array of contiguous c.c. cavities having windows in a common plane which windows are all equilateral triangles defined by the intersecting boundaries of contiguous cavities in said array by three sets of continuous parallel lines, all oriented in a flat plane with included angles of 60° between respective lines of each such set at a common point of intersection, each of said cube corners having its faces intersecting at dihedral angles of 90° ± 2.8 minutes of arc, and the respective adjacent lines in each of such three sets being spaced apart at a selected normal spacing width in the range from about 15.5 to about 830 microns between adjacent lines of each set, and the faces of said cube corners being all essentially specular mirrors having specular reflection coefficients of at least 0.6.

The invention provides a highly reflective surface array that has maximum surface area coverage of c.c. cavity mirrors or c.c. prisms, all possessing equilateral triangular windows and formed with precision so that divergence of the retroreflected beam due to optical imperfections is minimized, and in which the cavities containing the mirror surfaces are filled with an optically transparent solid medium to accommodate incoming and outgoing light rays making large angles (for example 80°) relative to the perpendicular to the face of the assembly, and in which the cube corners employed are of extremely small size and in an optimum arrangement so that the angular divergence of the retroreflected light attributable to diffraction is the dominant diverging factor. Thus, if the dihedral angles between adjacent mirrors are all 90°, and if the mirrors are flat, the resulting angular divergence of the retroreflected beam is so largely influenced by diffraction that a substantial fraction of the total reflected light is retroreflected back toward the source within a narrow cone defined by the diffraction pattern characteristic of such an array of small diffracting apertures. The observer's eye is intended to be within the brightest portion of this cone.

The hexagonal, close packed array of c.c. cavity mirrors or c.c. prisms selected for the present invention provides angular divergence by diffraction nearly double (about 1.8 times) that which would be obtained with any other array of apertures of the same size and shape. In addition, because of the diffraction patterns produced respectively by the edges of the windows of the cavities and by the lines of intersection of the three little mirrors in each cavity, two similar and complementary diffraction patterns are generated.

FIG. 3 shows photographs of the diffraction patterns generated from several different arrays of circular and triangular apertures as shown.

Figure 1:
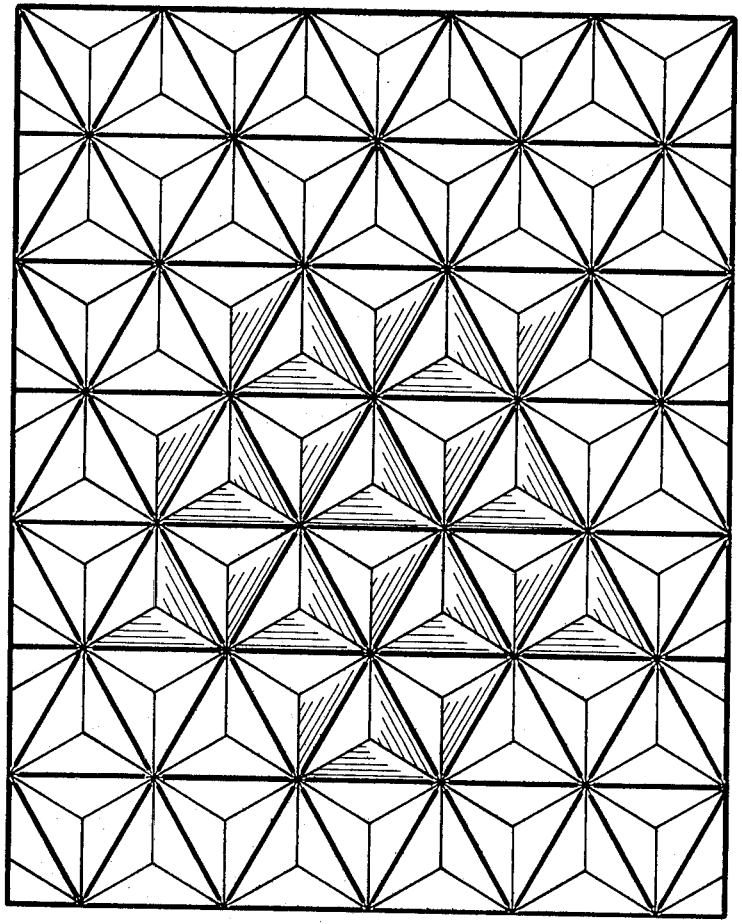
FIG. 1 is a plane projection of lines in the hexagonal close packed array of cube corners used in accordance with the invention.
Figure 2:
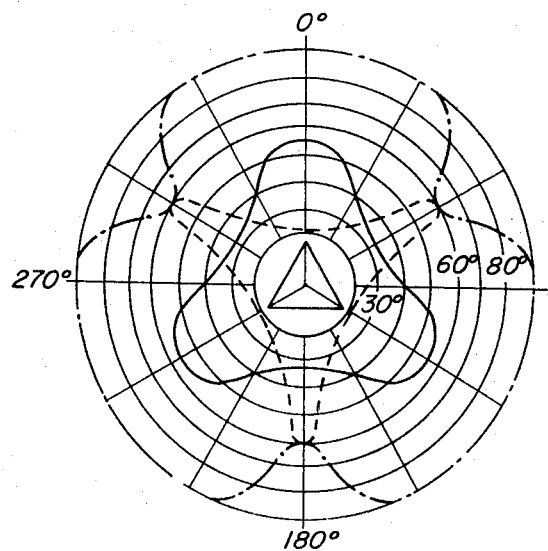
FIG. 2 is a double polar diagram depicting ranges of angles of incidence within which retroreflection will occur for several types of cube corner retroreflectors.

The c.c. array of the reflective surface illustrated in FIG. 1 of the drawings can be made by first forming a die. On a flat surface of a metal plate or other suitable material, three series of parallel equidistant intersecting grooves are inscribed having lesser included angles of 60° between any two intersecting lines of the three series. The grooves are arranged so that each point of intersection is crossed by one groove from each of the three sets, as illustrated in FIG. 1. Normally, the grooves are all cut with the groove axis normal to the flat surface and with a groove angle of 70° 31′ 43.6″ as the value desired; the tolerance on this angle will be discussed later. In addition, the grooves are all cut to equal depths sufficient so that after all three sets of grooves are made, none of the original surface area remains unruled. Thus there is formed a continuous pattern of sharp-pointed, solid trigonal pyramids with internal dihedral angles of 90° covering the inscribed surface. This pyramid pattern is a negative form of the desired c.c. cavity pattern, and the negative form may be used as a die for impressing the desired array of c.c. cavities in a flat plastic surface or in metal foil. The c.c. cavity array is then mirror coated on all of the c.c. cavity faces and finally filled with an optically transparent solid to complete the making of the retroreflector. By making a second-step replica of the ruled master employing optically transparent plastic possessing good dimensional stability, an hexagonal close-packed array of contiguous c.c. prisms is formed possessing equilateral triangular windows and projecting into the air behind a thin sheet or plate of plastic whose front face could be either flat or convex outward with a large radius of curvature either spherical or cylindrical as desired. Such an array of c.c. prisms would possess a theoretical retroreflective efficiency of 100 percent for rays inside the plastic incident on the plastic-air interfaces having angles of incidence relative to the perpendicular to any plastic-air interface greater than the so-called critical angle required to achieve total internal reflection. For prisms having a refractive index of 1.5, the critical angle is about 41.8°. If the angle of incidence is less than this value, some light leaks out into the air, and the retroreflective efficiency is reduced. There are marked variations in efficiency of retroreflection as the angle of incidence of the incoming ray is varied relative to the normal to the front face of the array and as the orientation of the ray is varied relative to some fixed line such as the boundary line between one pair of mirrors. FIG. 2, made from data given by N. E. Rityn in the article entitled "On some properties of right-angle prisms" in Zapiski po Gidrografii, 3, 1946, is a double polar diagram depicting the ranges of angles through which several different types of c.c. retroreflectors will retain this function. The widest and sharpest fluctuations with angle of incidence and orientation occur with the type of retroreflector that relies on total internal reflection. For an incident ray lying in the plane occupied by the boundary line between mirrors 1 and 2, and incident initially on either of these mirrors, the maximum angle between the ray and the normal to the front face for which retroreflection will be possible is about 22°. For a ray in the same plane but incident initially on mirror 3, this maximum angle of incidence relative to the normal to the front face of the array is 60°. There are three such maxima and three such minima in the entire polar diagram, and the minima coincide with the vertices of the equilateral triangular window. (This curve is the dotted line in FIG. 2). The polar diagram for a c.c. mirror filled with air is given by the full line in FIG. 2. The diagram for this configuration also has three lobes with maximum angles of ≈55° and minimum angles of ≈32°. This pattern is rotated by 60° relative to the previous pattern. Finally, the polar diagram for c.c. prisms with aluminized rear faces and for c.c. mirrors filled with an optically homogeneous, transparent medium is shown as the outermost polar diagram.

These two configurations are retroreflective for angles of incidence of nearly 90° relative to the normal to the front face except for three inverse lobes possessing maximum angles of incidence as low as 55° for incident rays lying in the three planes containing the three boundary lines between pairs of mirrors and incident initially on the mirror opposite any such boundary line.

It should be emphasized that FIG. 2 gives information only on the relative orientations and angles of incidence of incoming rays for which retroreflectivity will occur; FIG. 2 says nothing about the efficiency of retroreflection. For a single c.c., the efficiency will be given by the product of three terms, these are: the reflection coefficient after three successive reflections, the cross section of the c.c. presented to a plane wave after it has penetrated the material constituting the front window (if any) of the c.c., and the square of the transmission coefficient of the window. For an array of cube corners, an additional factor which gives the fractional area of the array actually allocated to cube corners is also involved. For c.c. prisms or filled c.c. mirrors in the configuration contemplated here, nearly 100 percent of the surface area is allocated to cube corners, so the area factor is unity. The reflectivity of the aluminum is about 0.9, and for three reflections would be $0.9^3 = 0.729$. The transmission coefficient of the window (two passes) would be about 0.92 if the surface is not treated to minimize reflection losses. Thus, at normal incidence, the retroreflective efficiency would be about 0.67. As the angle of incidence is increased, two factors (cross-section and transmission of window) decrease, and the overall retroreflective efficiency falls accordingly. However, a practically useful amount of retroreflective efficiency will still be retained at angles of incidence as large as 80° in air, measured relative to the normal to the face of the front window.

FIG. 1 may be viewed to represent either the c.c. pyramid array or the c.c. cavity array. Viewing FIG. 1 with the three intersecting 120° basic lines representing groove bottoms, the array will represent the pyramid array. The c.c. cavity array is seen when FIG. 1 is viewed with the same base lines representing lines of intersection of contiguous faces of respective adjacent c.c. cavities. It is seen that the windows which pass light into and out of each cavity are equilateral triangles.

As a background for explaining the diffraction effects that were found to be obtained with the selected close packed array of cube corners having triangular apertures, some preliminary considerations concerning circular aperture diffraction effects are presented.

If a collimated beam of monochromatic light is directed from a source such as a laser of lower power at a circular aperture having a diameter of say, 80 microns and drilled accurately in a thin (≈0.002 inch) piece of metal, it will be noted that, by diffraction, the light rays will be bent as they pass through the aperture, and when examined downstream from the aperture, will form on a white card or photographic plate the classical Fraunhofer diffraction pattern that is characteristic of a circular aperture. This diffraction pattern consists of a very bright central circular area surrounded by alternating dark and bright annular rings of ever increasing size. The geometrical relationships characterizing such a pattern and the equations giving the illumination in the pattern as a function of the angle off-axis can be found in detail in a test book such as "-

Principles of Optics" by Born and Wolf, The MacMillan Co., N.Y. 1959, page 394 et seq. For such an aperture, the angle off-axis ($\theta$) to the mid-point of the first dark ring is given by $$\sin \theta = \theta = 1.22 \times \lambda / D \qquad \text{(Eq. 1)}$$

where $\lambda$ is the wave length of the light and $D$ is the diameter of the aperture. Thus for $\lambda = 0.633\mu$ (He-Ne laser) and $D = 80\mu$, $\theta = 0.00966$ radian off axis. (One radian $= 57.30°$.) The angle of diffraction, $\theta$, varies linearly with wave length and inversely with some geometrical dimension of the aperture. Thus, a circular aperture of diameter $800\mu$ would produce a pattern with one-tenth this angular divergence. The value of the constant (here 1.22) depends on the particular geometrical dimension chosen for the aperture as well as on the geometrical shape of the aperture.

Next, consider the diffraction patterns produced by various arrays of circular apertures all of which are the same size, which are found to correlate as shown in FIG. 3. A diffraction pattern from a non-ordered multiple array of N apertures all the same size and shape possesses the same angular divergence as the pattern from one such aperture, has N times the illumination, and is not marked with interference minima. However, in an ordered array of such multiple apertures, when using monochromatic light, interference effects from light streaming through homologous points of neighboring apertures of identical size and shape and similarly oriented, produce interference minima passing through the diffraction patterns as depicted in various examples shown in FIG. 3. A computer, programmed to calculate the theoretical amplitude and intensity values to be anticipated for the illumination at various points in the patterns, gave values that were closely verified by experiment. In addition, it is seen that as the number of circular apertures is increased to 100 in a 10 × 10 rectangular array or in a 10 × 10 hexagonal close-packed array, the interference minima become not only more numerous but also much sharper so that when examined at a distance as great as 1,000 feet, these dark fringes would have half-intensity widths of only 3mm in monochromatic light. (This distance is about one-half the diameter of the pupil of a dark-adapted human eye.) For white light and for an array containing thousands or hundreds of thousands of apertures, these interference minima would disappear even when highly ordered or regular arrays of apertures are involved. Thus, even though theory and reputable text books teach that regular arrays of apertures should be avoided, I find, both by computation and experiment that for the practical case, the interference effects essentially wash out.

A diffraction pattern is examined as obtained from a commercial sample of retroreflective sheet containing spherical glass beads of high refractive index distributed in a plane at random and embedded in a plastic matrix of lower index equipped with contoured spherical mirrors to the rear of each bead. Using a throw of 21 feet from sample to observation screen, light from an He-Ne laser ($\lambda = 0.633\mu$) is reflected by the sample, and the measured diameter (center-to-center) of the first minimum of the diffraction pattern is found to be 13.2 cm. which is equal to $2 \times (r \times \theta)$ where $r = 21$ feet. Solving for $\theta$, ($\theta = 1.03 \times 10^{-2}$ radian), and using this in equation (1) yields a value of $D = 75$ microns for the diameters of the glass spheres. By microscopical examination, the spheres are found to have sizes ranging from 60 to $90\mu$ with the majority of diameters being close to $80\mu$. Thus, the diffraction theory as applied to this problem appears to work very well because the beads are nearly perfect spheres and because parallel monochromatic light is used.

Next, consider the manner in which diffraction theory is useful for ascertaining a relationship between the size of the diffracting aperture and the viewing distance at which it will provide an optimum performance. Consider the known photopic sensitivity curve of the normal human eye which peaks at a wave length of 0.555 illustrated in FIG. 4 micron. At two wave lengths, 0.510 and $0.610\mu$ which are symmetrically disposed relative to $0.555\mu$, the sensitivity of the eye is down to 50 percent of maximum. Assume that the light source employed does not have a steep slope of quanta emitted per unit solid angle per unit time in this wave length interval. (Actually, there will be a slope if the source is a tungsten filament lamp with a color temperature of only $\approx 3,000°K$, but this will not invalidate the illustration.) FIG. 5 shows the contour of the angular dependence ($\theta$) of the relative illumination (E) received at a plane perpendicular to the optic axis which is the line connecting the light source to the center of the circular aperture. The huge peak is the central bright disk which contains more than 82 percent of the light in the diffraction pattern. The subsidiary maxima belong to the annular bright rings. For smaller (or greater) values of $\lambda$, the angular divergence of the pattern will vary linearly with $\lambda$. Also, if a change in $\lambda$ is accompanied by a change in sensitivity of the light detecting device (here assumed to be the human eye), the illumination values will be altered accordingly.

Figure 6:
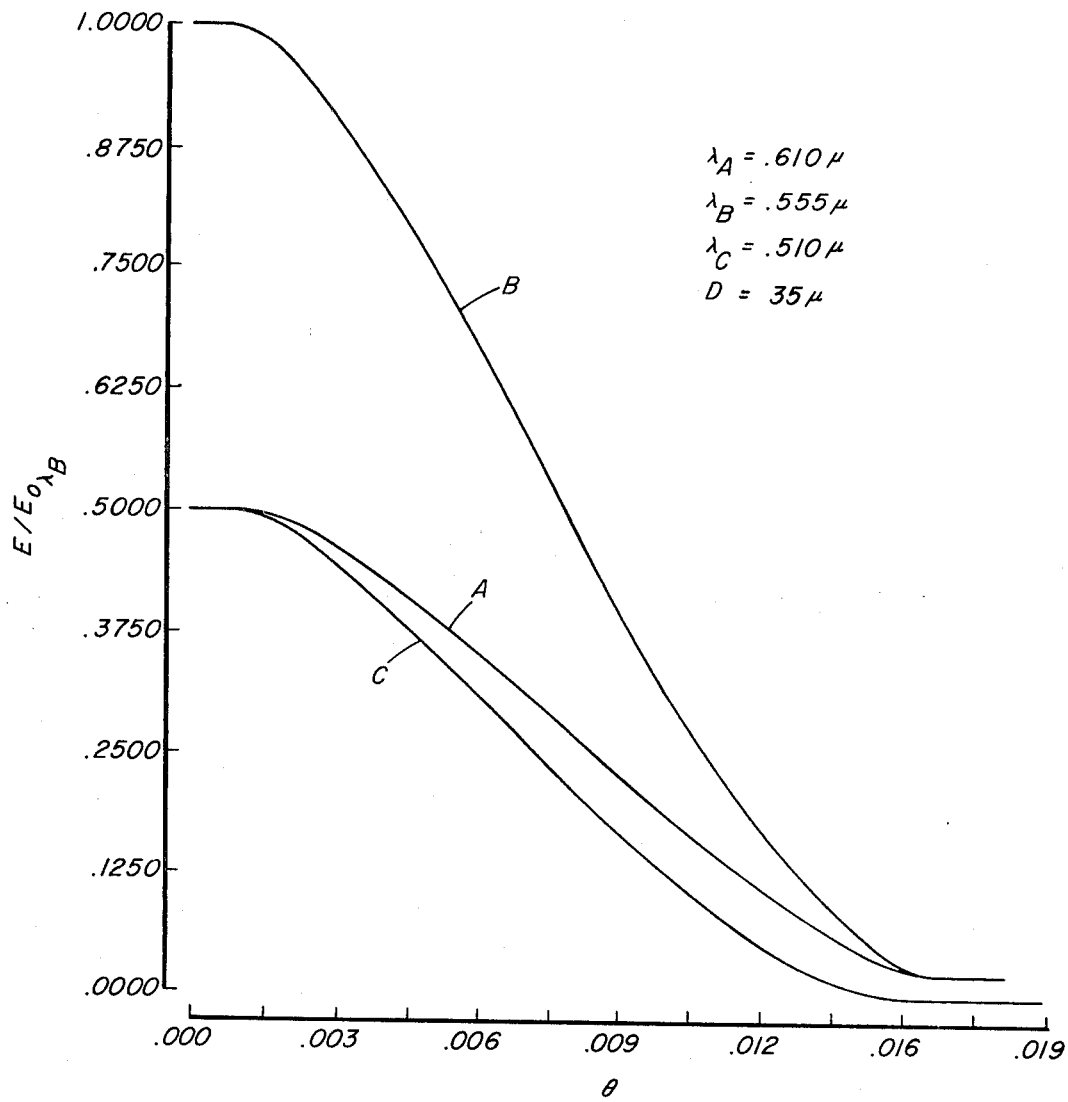
FIG. 6 is a series of curves, for monochromatic light of three different wavelengths, showing the relative illumination levels, as judged by the human eye, in the diffraction pattern generated by light retroreflected by an array of spherical glass beads.

As was discussed previously in connection with FIG. 3, multiple arrays of apertures of identical size and shape produce diffraction patterns having the same angular divergence and geometrical shape as the pattern from one such aperture. Also, this was born out in the case of the pattern obtained from retroreflective plastic sheet containing tiny spherical glass beads. FIG. 6 shows the contour of relative illumination versus $\theta$ for light of three wave lengths retroreflected and diffracted by such an array of glass beads and viewed by the normal human eye in a plane perpendicular to the optic axis in the vicinity of the light source. In automobiles, the eye of the driver will normally be about 2½ feet above the level of the headlights. Thus, since the maximum illumination in the diffraction pattern from circular apertures is always at the headlight (light source), and since the eye of the driver obviously can not be at that point, it is desirable that the eye should encounter a level of illumination somewhere between 40 to 60 percent of the maximum which is that returned to the headlight. This can be accomplished by choosing a size of aperture which will have the first minimum in the diffraction pattern roughly 5 feet off axis for $\lambda \approx 0.555\mu$ at a general working distance of 500 feet. Using equation (1) will yield an aperture diameter of $68\mu$ for such a set of conditions. Practically, since a range of viewing distances are required for rapidly moving vehicles, several different sizes (or a range of sizes) of apertures would be desirable, and these have to be ascertained empirically since the individual retroreflective circular apertures are not optically perfect, and since the light is neither monochromatic nor parallel. However, the theory does provide a very useful service in establishing guidelines.

Having demonstrated agreement between theory and experiment for arrays of circular apertures in this application, it was recognized that since c.c. mirrors or prisms normally do not possess circular windows, there should be expected a completely different type of diffraction pattern and a completely different degree of angular divergence than those arising from circular apertures. The c.c. mirror (or prism) in the selected array possesses three isosceles right triangles intersecting at 90° and a window which is an equilateral triangle. Since all the light entering and leaving the c.c. has to pass through this window, it is to be anticipated that a major feature of the diffraction pattern arises from an equilateral triangle. The geometrical shape of such a diffraction pattern was described more than 100 years ago, John Bridge, Phil. Mag. (4) 16, 321 ff (1858), but there is no value published for angular divergence of the pattern in terms of some linear dimension of the triangular aperture. Therefore, this value was both measured experimentally and calculated for a single, equilateral triangular aperture. It was discovered by experiment that both the diffraction and interference effects arising from various arrays of clear equilateral triangular apertures in opaque screens are, at least for the present purpose, quite analogous to those arising from similar arrays of circular apertures. (Refer to various examples shown in FIG. 3). Therefore, it was concluded that the half-intensity widths of interference minima from regular arrays of triangular apertures would be comparable to those from circular apertures and that it would be possible to use "ordered arrays of apertures" in white light in any practical application.

The diffraction pattern of a single equilateral triangular aperture is a symmetrical six-pointed star with a fat hub. The arms of the star consist of little islands of diffracted light surrounded by darkness. They become progressively smaller and less intense as they are farther from the hub. Also, additional islands of light which are less-easily visible features appear in V-shaped patterns symmetrically located between each pair of arms of the star. Just as is the case for the pattern from the circular aperture, the hub of the star contains more than 80 percent of the light in the diffraction pattern and is the important element. The diffraction pattern was photographed on 4 × 5 film placed a known distance from the aperture using no lens, and the angular divergence, $\theta$, was calculated from the center of the pattern to the center of the first minimum distinguishable between the hub of the star and the first bright maximum encountered while proceeding radially out along one arm of the star. The equation so derived is:

$$\text{Sin } \theta = \theta = 1.70 \, (\lambda/E) \qquad \text{(Eq. 2)}$$

where $E$ is the length of one side of the triangular aperture. By theory, the value of this coefficient is calculated to be 1.61 instead of 1.70, the value found experimentally. These values differ by only 5.6 percent which can easily be explained by experimental errors involved in the measurements. Multiple arrays of triangular apertures all of the same size and all similarly oriented produce the same pattern save for interference minima which appear when using monochromatic light.

Since the invention is concerned particularly with a peculiar array of cube corners whose equilateral triangular windows will consist of an hexagonal close-packed array of triangles one-half base down, the other half base up (see FIG. 7C), the diffraction patterns of such an array were examined using a He-Ne laser. The array examined consisted of 281,600 triangles each of which was originally 0.25 inch on a side (E) but photographic reduction produced one array having $E = 60\mu$ and another array with $E = 210\mu$. The diffraction patterns of these arrays were also six-pointed stars with the hubs being regular hexagons and with the individual islands of light in each arm of the stars also consisting of hexagons. However, this array of triangular apertures was found to have an angular divergence nearly double that of the pattern from a single triangular aperture of the same size. Thus, the experimental value of the empirical coefficient was found to be 3.02, and the equation was found to be:

$$\text{Sin } \theta = \theta = 3.02 \, (\lambda/E) \qquad \text{(Eq. 3)}$$

where $E$ is the length of one side of the triangles (all equal) and $\theta$ is the angle from the center of the pattern to the center of the first obvious minimum encountered when passing radially outward along one arm of the star.

The last result is significant in several regards. It determines the c.c. size needed to obtain a selected angle of divergence by diffraction. By comparison of this value with the coefficient derived for a single c.c., it is seen that the linear dimensions of the individual cube corners can be about 1.8 times as great to obtain a given angle of diffraction as the dimensions in other c.c. arrays in which the individual cube corners possess equilateral triangular windows. The larger c.c. size for a selected angle of divergence by diffraction simplifies the machining operations that are necessary to achieve the high degree of optical perfection required. If the divergence of this pattern were the same as that of the single triangular aperture, the linear dimensions of the cube corners required would then be smaller, and the difficulties of making precision dies and carrying out the embossing operations would be magnified considerably.

Taking into account the fact that the edges of the triangular windows determine three different sets of straight lines inclined at 60° to each other, it can be shown by calculation that the angular divergence observed is just what would be anticipated from three plane diffraction gratings ruled at 60° to each other with each grating having a groove-to-groove spacing given by the altitudes of the equilateral triangles (all equal).

Figures 7A, 7B, 7C:
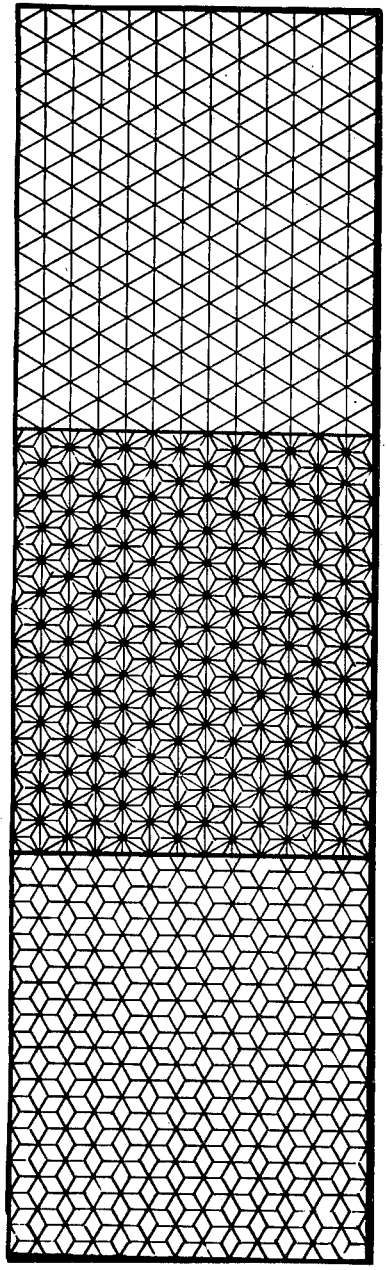
FIGS. 7A and 7B are plane projections of the patterns of surface intersections in two different cube corner arrays.
FIG. 7C is the plane projection of the ruling pattern for making the invention.

In addition to the three plane diffraction gratings consisting of the bottoms of the ruled grooves and, in a one-step replica, being the boundaries of the equilateral triangular windows of the c.c. cavities, the c.c. assembly possesses three more diffraction gratings. The periodic structures which generate these additional gratings are the projections of the three boundary lines of the three mirrors in each cavity back into the plane of the triangular windows. The projections of these lines define three sets of dotted or discontinuous lines also at 60° to each other as shown in FIG. 7B. However, even though they are discontinuous lines, they still contribute the periodicities capable of producing additional diffraction effects. The line-to-line spacing of the three gratings constituting the boundaries of the windows is equal to the altitudes of the equilateral triangles, and, as discussed previously, produces a diffraction pattern which is a six-pointed star. The three gratings which are members of the second set, which also are at 60° to each other, and are the ones generated by the projections of the boundaries of the mirrors, are rotated by 30° relative to the gratings in the first set and have a common spacing less than the gratings in the first set by a factor of ($1/\sqrt{3}$). Thus, the diffraction pattern of this second set of gratings will also be a six-pointed star rotated 30° relative to the first star and will possess an angular dispersion greater than that from the first set by a factor of $\sqrt{3}$ since the angular dispersion of a grating is inversely proportional to the spacing of the lines in the grating.

The significance of the foregoing is as follows: by ruling three sets of grooves in the manner prescribed we fill the entire surface with trigonal pyramids; there is no unruled surface remaining, and the bottoms of the grooves occupy essentially zero area if the tool is sharp. When singly replicated so as to generate either concave c.c. mirror cavities which are rendered highly reflective and then filled with transparent, solid plastic material, or when doubly replicated so as to generate transparent c.c. prisms protruding behind a transparent, solid plastic material immersed in clean air so as to work by total internal reflection or else rendered highly reflective by other suitable means, it will be noted that the diffraction patterns of both these configurations (c.c. concave mirrors in cavities or protruding c.c. prisms) possess two optimum viewing distances, one far and one near. The dominant pattern at large distance is the six-pointed star constituting the diffraction pattern from the three gratings with the coarse spacing; at closer viewing distance the diffraction pattern from the three gratings with the finer spacing becomes dominant; at intermediate distances both are of equal importance.

Thus, the diffraction effects achieved from replicas of trigonal pyramids generated in the fashion prescribed produce optimum effects at two viewing distances differing by a factor of $\sqrt{3}$, say 500 feet to 290 feet and near-optimum effects extending from distances as low as about 150 feet and as far as about 700 feet. In the cases of retroreflective devices employing spherical glass beads or the more common variety of c.c. mirrors or prisms possessing hexagonal windows, only one optimum viewing distance is obtained for one given size of retroreflector with a falling-off noted on either side (near or far) of this optimum distance. The diffraction patterns of an array of c.c. mirrors or c.c. prisms possessing hexagonal windows are the same, and both consist of a single six-pointed star. This diffraction pattern arises from the array depicted in FIG. 7A, and for cube corners possessing equal values of L, the length of one edge of a cube, the angular divergence will be that attributable to the gratings formed by the discontinuous lines constituting the projections of the boundary lines of the three mirrors into the plane of the hexagonal window of each c.c.

Figure 8:
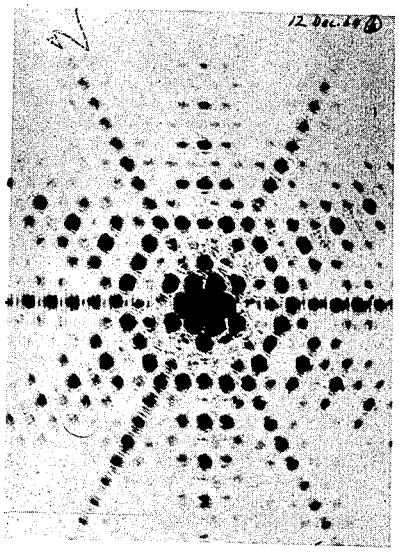
FIG. 8 is a photograph of a diffraction pattern generated by the pattern of lines shown in FIG. 7B.

It has been emphasized that it is impossible by the present state of the art to rule these three grids of grooves exactly as theory dictates. Consequently, in order to be more certain of the groove-to-groove spacing to be used, the diffraction pattern to be anticipated from the configuration of lines depicted in FIG. 7B was obtained. The lines were ruled with dense black drawing ink and then photographically reduced so as to achieve a positive on a fine-grain emulsion mounted on glass. The reduction was such that the altitudes of the equilateral triangles (groove-to-groove spacing) were very nearly 0.01 inch. Using a 1 milliwatt He-Ne laser ($\lambda = 0.6328\mu$), the aperture area was placed with the emulsion side away from the laser at a distance (171 cm.) such that the circular beam nearly filled the smaller dimension of the area shown in FIG. 7B. Thus, about 225 equilateral triangular apertures were employed. Using no lens, the diffraction pattern was photographed on a 3¼ × 4¼ inch glass plate at a distance 173 cm. downstream from the plane of the apertures. A reproduction of the photograph of this diffraction pattern is shown in FIG. 8. There are two six-pointed stars rotated by 30° relative to one another, and the ratio of angular dispersions in the two stars is $1.732 = \sqrt{3}$ as it should be. Also, when the members of one set of lines bounding the equilateral triangular windows were vertical, one leg of the six-pointed star with smaller angular dispersion was in the horizontal direction as it should be. By direct linear measurements, it was verified that the distance off axis of the centers of the spots (measured along the center lines of the arms of the stars) obeyed the diffraction grating equation $$M\lambda = d(\sin i \pm \sin \theta) \qquad \text{(Eq. 3)}$$

where $M = 0, \pm 1, \pm 2$, etc.; $\lambda = 0.6328\mu$, the wave length; $d = 254\mu$ (0.01 inch), the grating spacing; $i = 0$, the angle of incidence; and $\sin \theta = \sin$ of angle of diffraction = (linear distance from center of pattern/173 cm.) = $\theta$ in radians when $\theta$ is small.

The photographically reduced grid employed for generating the diffraction pattern had a line-to-line spacing of 0.02469 cm. instead of 0.0254 cm; also red light of $\lambda = 0.6328\mu$ was used instead of yellow-green light of $\lambda = 0.555\mu$, and the procedure employed simulated c.c. mirrors filled with air instead of with plastic having $n = 1.5$ ($n$ = refractive index). Thus, the various angular divergence values measured on the diffraction pattern, as photographed, were corrected by a factor equal to the product of the following three factors:

$$(0.0254/0.02469) = (0.555/0.6328) = 1.5 = 1.2787.$$

As stated, the values of angular divergence measured on the diffraction pattern as photographed using red light, ($\lambda = 0.6328\mu$) agreed with results calculated by Eq. 3. Also, as anticipated, the experimental values when multiplied by the product of the first two factors above (the factor 1.5 being omitted) gave numerical agreement with Eq. 3 when using $d = 254\mu$ and $\lambda = 0.555\mu$. Thus, in calculating the positions of all the spots in the diffraction pattern to be anticipated from a perfect grid of c.c. mirrors filled with an optically homogeneous material having $n = 1.5$ and generated by ruling three sets of grooves with a spacing of 0.01 inch and using light of $\lambda = 0.555\mu$, theory alone was employed. In Eq. 3, the sines of the angles are employed. In what is to be done now, the angle of incidence will be taken as zero and sin $i$ also is zero. For the angle of diffraction, $\theta$ (in radians) will be numerically equal to sin $\theta$ for values of $\theta$ no larger than 0.1 radian ($\approx 5.7°$). For the three coarse gratings, defined originally in the ruled master by the bottoms of the grooves and in a one-step replica by the lines which form the equilateral triangular windows, the spacing is 0.01 inch ($254\mu$), and $\theta$ for $M = 1$ (so-called first order) will be $3.279 \times 10^{-3}$ radian. For the three finer gratings defined by the discontinuous lines constituting the boundaries of the mirrors, $\theta$ will be greater by a factor of $\sqrt{3}$, and the value for $M = 1$ (first order) will be $5.679 \times 10^{-3}$ radian. It is to be recalled that these six gratings (two sets, three each) generate a diffraction pattern containing two six-pointed stars rotated by 30° relative to one another.

The various orders with $M = \pm 1, \pm 2, \pm 3$, etc. lie along the center lines of each leg of the respective stars. However, there are many spots of light in the diffraction pattern which do not lie along these obvious and principal directions. Thus, the next thing to be done is to derive the locations of all the spots or at least those which are the most prominent. This can be done mathematically or by what amounts to geometrical construction. The latter method is employed using two bow dividers and a piece of polar coordinate paper. We lay off the orientations of the lines constituting the six gratings and keep in mind that the light will be diffracted in directions perpendicular to these lines. We start with the laser beam which has a circular cross section. It encounters this array of apertures and is diffracted. The spot which ends up on axis and undeviated (zero order) is the most intense spot and defines the center of the pattern. For each of the three coarse gratings, $d = 254\mu$, there will be two first order spots ($M = \pm 1$) in each of three directions, and they will be $3.279 \times 10^{-3}$ radian off axis. These are the six spots closest to the center; in FIGS. 8 and 9, one two-fold axis of this hexagon is horizontal. In addition, for the three gratings of finer spacing, $d = 254\mu/\sqrt{3}$, there will be six first order spots all $5.679 \times 10^{-3}$ radian off axis; this hexagon is rotated 30° relative to the first one and has one of its two-fold axes vertical in FIGS. 8 and 9.

Figure 9:
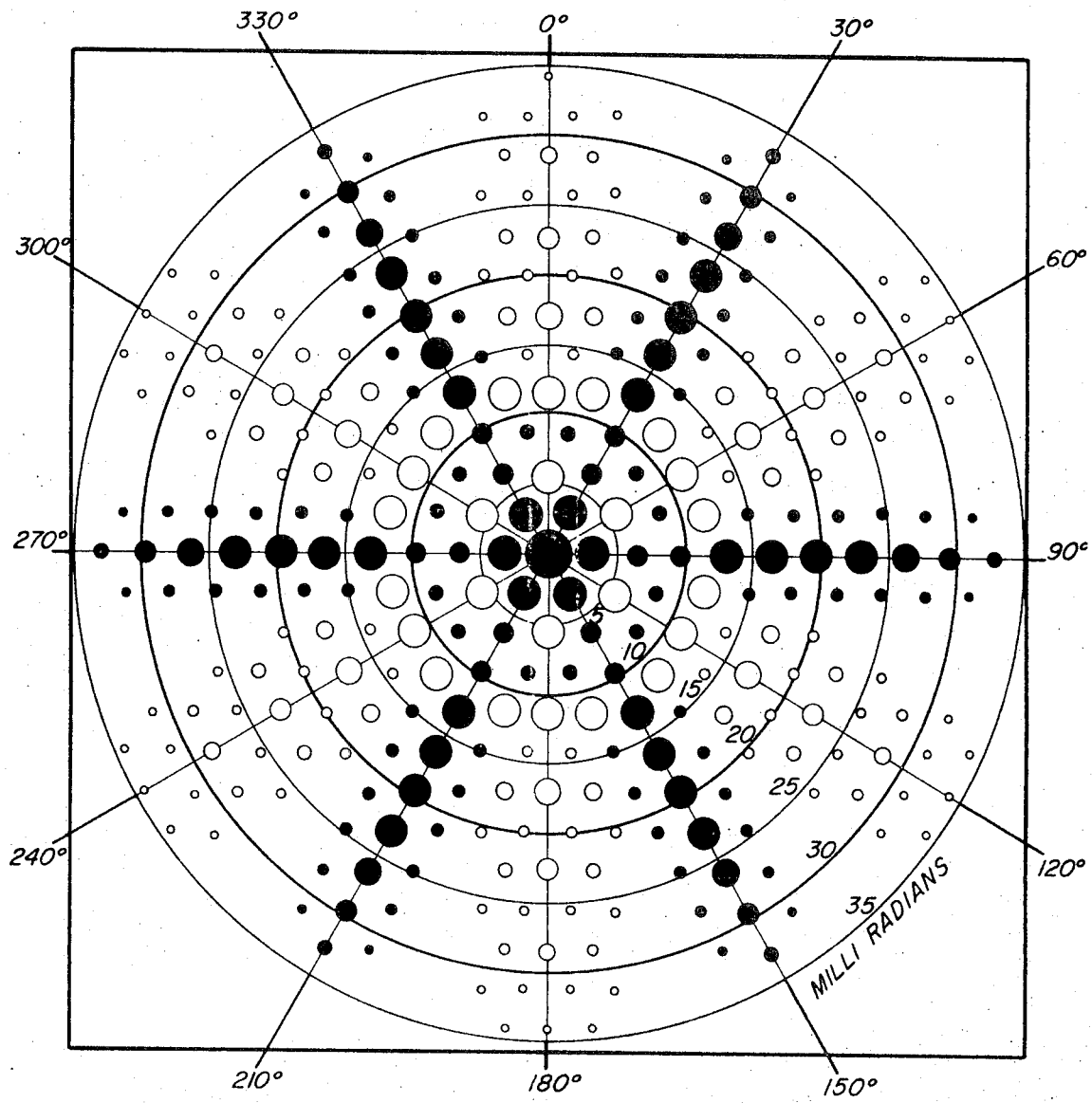
FIG. 9 is a polar diagram of the diffraction pattern to be anticipated from the retroreflective array of cube corners used in the invention.

These new beams with $M = \pm 1, \pm 2, \pm 3, - - -$ have angles of incidence on the array different from that of the laser beam, and all of them are now multiply re-diffracted not only by the other two gratings which are members of their own set but also by all three gratings belonging to the other set. Fortunately, because of the fairly rapid decline of intensity with the order of diffraction, essentially all the important features can be generated by re-diffracting the 12 first order spots belonging to the two hexagons. Because the gratings have spacings differing by a factor of $\sqrt{3}$ and because sin $30° = \frac{1}{2}$ and cos $30° = \sqrt{3}/2$, as these spots are re-diffracted first along one direction (spacing $d_1$) and next at 30° thereto (spacing $d_2 = d_1/\sqrt{3}$) numerous coincidences occur thereby opening up possibilities of generating marked changes in intensities by constructive and destructive interference. In FIG. 9, the spots diffracted by any one of the coarse gratings are shown by filled circles while the open circles indicate diffraction by any one of the finer gratings. It should be remembered that the spots can be generated by being diffracted only once or as many as six (or more) times.

By studying FIGS. 8 and 9, it is seen that the geometrical locations of the spots photographed (FIG. 8) are predicted correctly by theory (FIG. 9). However, very little has been said about the intensity distribution which is also an important question. In FIG. 8 it can be seen that we have one central spot, six spots ($M = \pm 1$, coarse gratings), six spots ($M = \pm 1$, fine gratings) and then the illumination falls off markedly throughout an annular zone which should be allocated to the spots for $M = \pm 2$ and $\pm 3$ (coarse gratings, principal directions) and to certain spots arising from re-diffraction. This weak zone is bounded at larger angles off axis by 24 spots: 6 from $M = \pm 4$ (coarse), 6 from $M = \pm 2$ (fine), and 12 from rediffraction. By taking several photographs (FIG. 8) of different exposure times, one was obtained which permitted an experimental evaluation of the optical densities of the silver deposits for these 24 spots and for the strong 13 innermost spots. By photographic photometry, these optical density values were converted to relative intensity values, and it was found that these were as follows:

$M=0 : M=\pm 1$ (coarse) $: M=\pm 1$ (fine) : 24 outer : :
100:11.7: 5.6:2.75

From more strongly exposed plates, intensity estimates were made for the weaker spots. From the sum total of the data it is found that about 70 percent of the diffracted light resides in the zero order plus the two first order hexagons all of which lie inside a cone no more than $6.8 \times 10^{-3}$ radian off axis. In addition, by taking into account, the outer hexagon containing 24 spots, it is seen that 90 percent of the diffracted light is inside a cone no more than $1.3 \times 10^{-2}$ radian off axis. (The semi-angle of divergence of the laser beam is only $0.5 \times 10^{-3}$ radian and has been neglected.)

The diffraction pattern obtained from the lines characteristic of an array of cube corners shown in FIG. 7A is not shown here. It contains a single six-legged star, and the spots diminish in intensity as the orders increase. The angular dispersion is characteristic of three gratings having a common spacing of $(254/\sqrt{3})\mu$. It is believed that the annular dead space in FIG. 8 is caused in part by the prominent, opaque, 12-legged pincushions created while ruling the array in FIG. 7B, and that this dead space in the diffraction pattern should be less prominent than it actually appears in FIG. 8. However, the remarks about the zones occupied by 70 percent and by 90 percent of the diffracted light remain unaltered.

The tightness and intensity distribution of the diffraction pattern to be anticipated from an array of c.c. mirrors (filled) or c.c. prisms when made "perfectly" indicate that a groove-to-groove spacing of 0.01 inch in the ruled master should be satisfactory for generating retroreflective sheet to be employed for large viewing distances. In addition, the diffraction pattern provides a means of ascertaining the maximum errors which can be permitted in the 90° dihedral angles. These, in turn, can be converted into the tolerances which pertain to the actual mechanical ruling operation.

The eye of the driver of an automobile is about 2.5 feet above the headlight on the driver's side. At a viewing distance of 500 feet, the eye would be off axis (driver's headlight) by ≈0.005 radian (0.3°). To calculate the maximum allowable errors in the 90° dihedral angles, we assume that the errors would all be made in the manner that would produce the maximum angular divergence attributable to such error. This assumption would call for all three angles to be off by approximately the same amount and would yield six retroreflected beams and six diffraction patterns with the zero orders of these patterns at the vertices of a regular hexagon. Let the errors be large enough to throw the zero orders two feet off axis at 500 feet which is an angle of 0.004 radian = δ. The intensity then is reduced at the viewer's eye by a factor of ≈1/1.25, maximum. For filled c.c. mirrors or for c.c. prisms, the errors ($\phi$) in the 90° angles would be defined by:

$$\delta = 3.26 \times \phi \times 1.5$$

which makes $\phi = 8.18 \times 10^{-4}$ radian = 2.83 minutes of arc, and thus, the internal dihedral angles of the trigonal pyramids are to be 90° ± 2.8 minutes of arc.

Next, the maximum errors in the 90° angles must be translated into the allowable errors in the mechanical ruling operations, and there appear to be four of these. They are: (i) the error in the groove angle; (ii) the departure from perpendicularity of the bisectrix of the angle of the tool to the plane of the work; (iii) the departure from 60° (or 120°) of the grooves of one set to those of each of the other two sets; and (iv) the accuracy of the groove-to-groove spacing.

Error No. (iv) is the easiest to control, and we specify that the groove-to-groove spacing is to equal the value desired (254μ) to within ± 1 μ such errors to be random and not commulative. Ordinarily, such errors will merely translate the pyramid faces but leave them parallel to the ideal positions. However, larger errors of this type could cause the pyramids to have flat tops instead of sharp points.

Normally, the work would be fastened to the surface of an equilateral triangle or a regular hexagon to ensure rotation of 60° (or 120°) in going from one set of grooves to another. Such a device would normally be made by procedures commonly employed in a precision optical shop, and the angles could be held to 60° ± 0.2 minute of arc. This will serve to define the upper limit of Error No. (iii). (If we use a triangle, and if one angle is 60° + 0.2', then the other two angles must be in error by a total of − 0.2' to have the sum of all three angles equal to 180°).

Error No. (ii) can be held to better than ± 0.2 minute of arc so it is specified that the bisectrix of the v-shaped tool shall be perpendicular to the plane of the work to within ± 0.2 minute of arc as measured in a plane parallel to the v-shaped cutting face of the tool.

Since Error No. (i) is the most difficult to contain, it has purposely been permitted to be the largest. Thus, it is stipulated that the groove angles as ruled are to be 70° 31'43.6" ± 2.4 minutes of arc which is rewritten as 70° 31.7' ± 2.4 minutes of arc.

The various types of errors listed to not produce exactly the same numerical errors in the 90° dihedral angles. Thus, for example, if the included angle of the tool is too small and if the bisectrix is perpendicular to the plane of the work, the faces of the pyramids will be inclined to the axes of the pyramids at angles steeper than the proper value by an angle equal to one-half the error in the included angle of the tool. Since this happens to all faces, the dihedral angles will be too tight and the errors in any angle between two faces are roughly, but not exactly, equal to the error in the entire included angle of the groove, and the tool. Obviously, the important thing in achieving correct optical performance of the finished product will be the accuracies of the dihedral angles possessed by the c.c. mirrors or prisms in the retroreflective sheet. It may well happen that the method employed in replication will alter these angles. When this is found to be so it must be recognized and appropriate steps taken, if necessary, to introduce purposely, during the ruling operation, errors in the dihedral angles of such a nature that in the finished product, after replication, they will be 90° to within the tolerance specified (± 2.8 minutes of arc).

When the ruling and replication procedures employed are capable of meeting this tolerance level (or can achieve even higher quality) it would generally be desirable that the faces of the individual mirrors should be essentially flat to within about ± one-quarter of the wave length of yellow green light ($\lambda/4 = 0.555\mu/4 \cong 0.14\mu$). However, because the mirrors are so small, it is not possible to measure the optical flatness by conventional means. The faces of the metal pyramids of a ruled master could be examined by a microscope employing an interferometer or by a scanning electron microscope. However, a high degree of excellence in the faces of the metal prisms will not guarantee the perfection of the surfaces of the c.c. mirrors or c.c. prisms which, obviously, will depend on the methods employed for replication. What can be said is this. The mirror surfaces generated in the retroreflective array to be employed must have surface finishes which are efficient specular reflectors; these surfaces can not be diffuse reflectors because too much light will be scattered at wide angles. When using an incident beam of parallel white light (color temperature≈3,100°K), the total light retroreflected and detectable in one hemisphere shall be greater than 24 percent of the light specularly reflected from a single, flat, front-surface aluminized mirror having a reflection coefficient of ≈0.9, and 90 percent of this retroreflected light shall reside inside a cone of radius 0.015 radian off the optic axis which is also the axis of the cone. This will require that the specular reflection coefficients of the individual c.c. mirrors shall be at least 0.60.

Before discussing the procedure employed in ruling the master dies, it is well to set down the various geometrical factors which pertain to a c.c. possessing an equilateral triangular window. These are shown in FIGS. 10a, 10b, and 10c, and they also are held in common by the pyramids created by the correct ruling procedure.

Figure 10A:
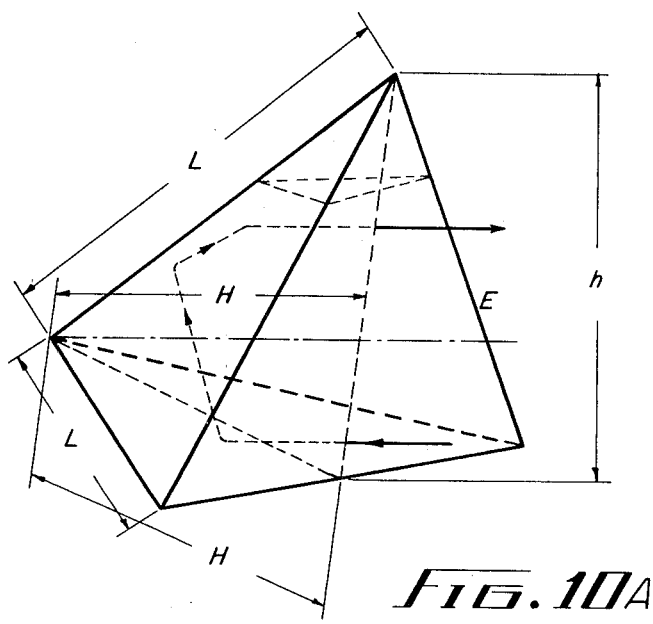
FIGS. 10A, 10B and 10C are geometric views of pyramids for making the retroreflector surface of the invention.

FIG. 10a is a three-dimensional diagram in which $L =$ length of edge of cube; $E = L\sqrt{2}$, the length of each edge of the equilateral triangular window; $h =$ altitude of window = groove-to-groove spacing of ruled master die; $H = L/\sqrt{3} = E/\sqrt{6} = (h/3)\sqrt{2}$ is the altitude of the c.c. = the height of the pyramids = the depth of the grooves.

Figure 10B:
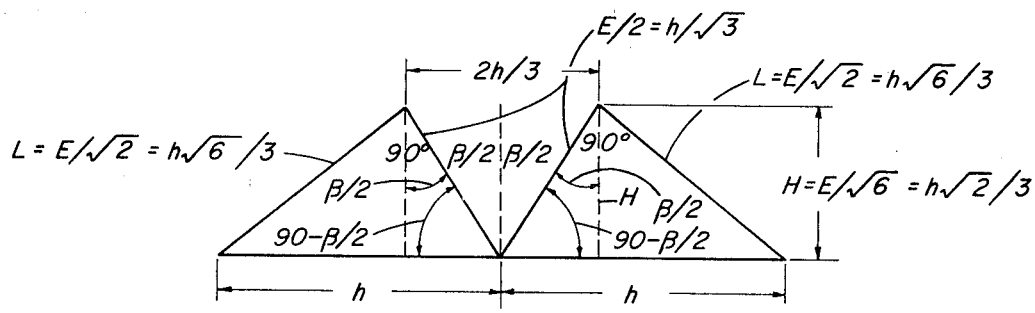

FIG. 10b is a vertical section taken through two adjacent pyramids which share one groove in common. From this figure it can be seen that when the trigonal pyramids have sharp peaks, the total width of one groove at the top is $(2/3)h$, that the depth of the grooves is $(\sqrt{2/3})h$, and that the tangent of the semi angle $(\beta/2)$ of the grooves is $(1/3)h(\sqrt{2/3})h = 1/\sqrt{2} = \sqrt{2}/2$ which leads to the value of 70° 31' 43.6" for the total included angle of the groove and, supposedly, the desired value for the v-shaped tool required for ruling the grooves.

Figure 10C:
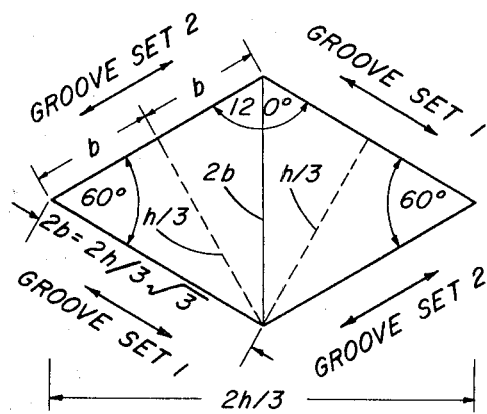

FIG. 10c is the top view of the flat top of one of the tetragonal pyramids generated by the ruling procedure after only two sets of grooves have been made. This is a rhombus having two vertex angles of 60° and two of 120°. From this figure it is seen that the peak-to-peak spacing in this direction is $(2/3)h$, and that the altitude of the rhombus in the short direction is $h/3$ which, in turn, is the width of unruled land remaining between contiguous edges of two adjacent grooves after only one or two sets of grooves have been ruled. It is important to be mindful of this fact in order to diminish the greater depths of the grooves which would occur if the rulings were carried out in a manner such that the tetragonal pyramids had sharp points instead of the flat tops shown in FIG. 10c.

There are three principal methods by means of which the faces of the metal pyramids can be made to be optically flat and manifest specular reflectance with high efficiency. These are: (i) Direct ruling with a v-shaped diamond tool with the two edges of the cutting face ground and polished on a diamond-charged lap. (ii) By roughing out the three sets of grooves in hard metal initially with a diamond or carbide tool followed by lapping in three directions with soft metal laps containing only one set of grooves and charged with diamond dust as an abrasive. (iii) Creating all three sets of grooves by lapping alone.

With regard to (i): By ruling the grooves in fairly soft metal, e.g., aluminum or copper, which has been polished flat on one surface without causing the surface to be charged up with abrasive, capable of accentuating the wear of the diamond, the diamond tool imparts an optical polish to the walls of the grooves (faces of the pyramids), leaves the tips of the pyramids sharp, and does not leave burrs or rough edges at the intersections of the faces of the pyramids with one another. If a single diamond tool is used in a shaper-type ruling engine (one in which the tool is constrained to travel in a straight line, cutting on the forward stroke, lifted on the return stroke, with the work being translated at right angles thereto by pre-selected increments after the end of each cutting stroke), each groove requires as few as 5 and as many as 10 passes to obtain the desired depth. At this point, the die is finished, and no additional polishing of the faces of the pyramids is required. However, because the metal is soft, such a master die is too soft to be used directly for embossing, and it is necessary to employ suitable replication procedures in order to obtain dies capable of producing c.c. cavities or c.c. prisms. (Dies for these two end uses require two-step or one-step replication procedures, respectively, starting with the master.)

In ruling diffraction gratings possessing only one set of parallel grooves, it is customary (other than with the very coarsest gratings) to displace metal by the shaped diamond tool in a burnishing type of operation rather than to remove metal. The included angles on such diamond tools are generally shaped to within only $\pm \approx 0.5°$; this error, even for a grating with a spacing so fine as to have $d = 2 \times \lambda$, the wave length of the "blaze" of the grating would be thrown off by only 75 parts in 5,000 which would be of no concern. Thus, in the art of ruling grooves in metal with a diamond tool, very little is known about the "plastic memory" of the metal, and it is not certain that the ruled grooves will have the same included angle as that of the tool. In addition, if the metal is soft, plastic deformation may be introduced by the procedure which involves cross rulings at angles other than 90°. Thus, it is necessary to check the included angles of the grooves actually produced by a tool of known angle in the metal which is to be employed. In measuring the angle of one of the grooves, difficulties arise because of diffraction effects which are attributable to the small size of the "aperture" of one groove. However, auto-collimating devices may be employed by working with the "zero order" of the light reflected from the two faces in succession in order to obtain the included angle for the groove.

In forming the ruling tool, special means have to be devised for measuring the included angle to be certain that it has the value desired within the tolerance prescribed. Grooves made as desired would have a depth of 0.0047 inch so we would be concerned with the degree of perfection of the bottom 0.005 inch of the tool. If we assign ± 2.4 minutes of arc to the error in the angle of the tool it turns out that the linear dimensions of the half angle of the tool must be held to $\approx \pm 9 \times 10^{-6}$ inch which may be difficult to achieve. However, if the angle of the tool is slightly less than the value desired and if the angle can be measured in a 100× shadowgraph or by ruling a groove and measuring the groove angle with a goniometer, a laser beam, or an auto-collimating device, it will be possible to tip the tool by a calculable amount in order to rule grooves having exactly the angle desired.

Let $\theta$ = Angle of departure of cutting face of tool from the 90° (vertical) position in a plane perpendicular to the work and parallel to the groove length Let $\alpha$ = ½ angle of tool as measured Let $\beta$ = ½ angle of tool as desired [½(70°31'43.6")], then, $\cos\theta = \tan\alpha/\tan\beta$ with $\tan\beta = 0.7071067$ Case 1: $\alpha = \beta$; $\cos\theta = 1$, $\theta = 0$ (no tipping necessary)

Case 2: $\alpha = \beta - 8$ seconds; $\theta = 0°43'(26"$ to $29") \equiv 0.0126342$ radian Case 3: $\alpha = \beta - 16$ seconds; $\theta = 1°2'19" \equiv 0.0181272$ radian Case 4: $\alpha = \beta - 30$ minutes; $\theta = 11°3'23" \equiv 0.1919724$ radian Once the actual tool angle is measured and the value of $\theta$ calculated, some sort of lever arm (or an auto-collimating device held in the collar which normally holds the shank of the tool) would be required to achieve the angular adjustment. If this lever arm were 1 meter long, $r \times \theta$ for the smallest $\theta$ (Case 2) would amount to 12.6 mm. In Case 4, with the half angle of the tool off 0.5°, a lever arm 1 meter long fastened to the shank of the tool should be moved 19.2 cm. in order to tip the tool the exact amount required to rule grooves of the angle desired. Thus, this problem can be handled if the angle of the tool or that of grooves made with the tool can be measured.

It is virtually certain that the axis of the shaft on which the tool is mounted will be co-linear with (or at least parallel to) the bisectrix of the angle of the tool. Thus, it would be necessary to orient the axis of the collar that holds the shaft of the tool so it is perpendicular to the plane of the work to ± 12 seconds of arc equivalent to $5.82 \times 10^{-5}$ radian as measured in a plane perpendicular to the work and parallel to the V-shaped cutting face of the tool. Again, this could be done using a lever arm 1 to 2 meters long provided with a dial indicator in conjunction with two reference planes, one on either side, or, more easily, by a small precision autocollimating device capable of an accuracy of ± 1 or 2 seconds of arc.

In ruling the three sets of grooves it is not certain that the tool will make the first groove of the second or third sets of grooves the same distance one side of center just because the lead screw was run back to the same starting position after finishing one set of grooves and rotating the work by 120°. This is of no great concern in cutting the first two sets but it is extremely important to establish the correct starting position for the grooves of the third set. To do this it is recommended that a travelling microscope be arranged so that by optical inspection it can be established that the cutting edge of the tool bisects all the tetragonal pyramids encountered in the first row, the middle row, and the last row. To make this test, the cutting edge of the tool is set on the starting side of the cutting stroke, near one extreme limit of travel of the work, so as to be in line with the vertex of one of the 120° angles of the top of a tetragonal pyramid. The tool is lowered so that it just grazes the surface and it is then made to make the thinnest cut possible. Then, by optical inspection, the orientation of this "scratch" relative to the tops of all the tetragonal pyramids is made at $\approx 40\times$. The same thing is done at what will be the mid point of the third set of grooves and also at the position which will correspond to that of the final groove of this set. In all three of these "scratches," when examined at this power, the scratches must bisect all the 120° angles with no perceptible error. If any errors are noted, they should be interpreted and appropriate corrective steps taken.

An alternative way of generating these grooves in soft or hard metal would be to use a precision milling machine having a disk-shaped cutting wheel whose axis of rotation is horizontal and perpendicular to the plane of the disk on the periphery of which are located 10 to 20 tungsten carbide inserts possessing ground and polished cutting faces having the desired included angle of 70°31.7′ ± 2.4′, with the bisectrex perpendicular to the axis of rotation. In this situation, the work is translated in one direction while the cutter rotates with its axis of rotation fixed in space. After this groove is cut, the table holding the work is then translated the required distance (perpendicular to the long dimension of the groove) and the next groove is cut. As before, the work is mounted on an equilateral triangle or a regular hexagon to permit rotation by 60° or 120° in going from one set of grooves to the next. A precision machine of this type is more rugged that the research or production type of ruling engine which employs a lightly weighted diamond tool. Thus, instead of requiring as many as 10 passes per groove, only two or three would be necessary. In addition, the entire area of the work could be filled with pyramids since the cutter could go to the extreme edges of the work whereas, with the ruling engine, this is normally not the case, and the pyramids are generated only in the area occupied in common by three different square ruled areas having a common center but rotated by 60° relative to one another.

It is also possible that the rotary cutter would permit the generation of the pyramids in a much harder metal, in which case an alloy possessing good possibilities is Haynes Stellite, Alloy No. 6B (annealed, Brinnell hardness $\cong$ 300) a commercial alloy whose principal component is cobalt and which can be machined by diamond or WC tools without galling; also, it does not corrode and can be optically polished. This allows embossing experiments to be carried out directly with the ruled master whereas only cast or electrodeposited replicas can be made directly from a ruled master made of soft metal such as aluminum or copper.

With regard to methods (ii) and (iii), which involve ruling and lapping procedures or lapping alone, both have elements in common and can be discussed together. In these cases, the lap consists of a soft metal such as, for example, bronze or brass whose surface is capable of being charged up with fine abrasive particles such as diamond dust and is then rubbed repeatedly against a hard metal, (or glass, or fused quartz) using an appropriate lubricant until the abrasive in the lap wears away the hard metal whose surface becomes the inverse of that of the lap. If we initially rough out all three sets of grooves in the hard metal (method (ii)), the time involved in lapping will be much less and will not require the preparation and use of as many laps as would be the case if we use lapping alone (method (iii)).

To use method (ii) we prepare three sets of grooves at 60° to each other in a piece (4 × 4 × 0.375 inches) of Haynes Stellite 6B annealed so as to have a Brinnell hardness of 300 employing the circular cutter with WC teeth inserted and observing all the precautions outlined previously. In addition we prepare three bronze laps (4¼× 5 × 0.375 inches) containing only one set of parallel grooves 5 inches long but having sufficient depth to the grooves so that no unruled area remains. In addition, one set of parallel grooves of this same description is prepared in another piece of Stellite (4¼× 5 × 0.375 inches). Both long edges of the laps must then be equipped with side fences and the outer limits of the edges of the fences must be made parallel to the grooves and also must be at a distance from any one groove of the lap which is equal to an integral number of groove-to-groove spacings. Each of these three bronze laps is then charged with diamond dust having average particles sizes of 10, 5, and 1 $\mu$ respectively. Both Stellite pieces are then lapped proceeding from coarser to finer successively. The lapping is carried out using only mild pressure and a length of stroke such that no more than one-third the length of the lap projects beyond the end of the work at each limit of the lapping strokes. The lap is turned end for end every hundred cycles and moved sideways 10 grooves R, then 20 grooves L, then 40 grooves R, then 80 grooves L, then back to the original position, one such change being made every hundred cycles. (These sideways translations are achieved by displacing the fence that guides the lap by inserting plane parallel fillets of the desired thicknesses.) The rotation of the work by successive increments of 60° is achieved, as before, by the use of the hexagon which still holds the work in the manner used while ruling the grooves. The alignment of the hexagon and the fence is achieved by available 60° and 90° precision polished blocks. Before changing from one size grit to another, the work is scrubbed with oil and solvent after which the lap charged with the next smaller size of diamond dust paste is used for polishing the faces of the pyramids by lapping as before in all three directions. The final polishing of the faces of the prisms is achieved by using a pitch lap (backed by a flat holder) with one set of grooves made by standing in contact with the previously lapped-and-polished piece of Stellite, the one containing only a single set of grooves having an included angle of 70°31.7' ± 2.8'. The polishing agent used with the pitch lap is a water slurry of elutriated ferric oxide (red $Fe_2O_3$), free from ferrous sulphate, having particles less than $1\mu$ in their largest dimensions. After this final treatment using the pitch lap, by optical inspection, the faces of these tiny pyramids are seen to be highly-polished, mirror-like surfaces free from scratches and polishing sleeks. The pyramids are about 0.0047 in. tall, the length of each edge of the equilateral triangle at the base of each pyramid is about 0.0115 in., and the length of each inclined edge of the pyramids is about 0.0082 in. (The groove-to-groove spacing remains 0.010 in.)

In the event it is desirable to generate the pyramids in very hard material such as tungsten carbide, for example, it will probably be necessary to use method (iii) which involves lapping alone other than in forming the grooves in the laps which are still ruled as before. This may require as many as 6 bronze laps plus one of pitch. In preparing the bronze laps, all are ruled with no unruled land remaining, and three of them are used employing $15\mu$ diamond dust in roughing out the grooves. After this, the lapping proceeds the same as is described before except that the pitch lap is charged with $1\mu$ diamond dust instead of rouge.

EXAMPLE 1

A piece of soft aluminum plate 3½ × 3½ × ⅜ inches was polished flat to a mirror finish on one side and three sets of grooves ruled in this face by means of a sharp-pointed, v-shaped diamond tool possessing the correct included angle (70°31.7') to within better than ± 1 minute of arc as judged by inspection using a microscope containing a custom-made measuring eyepiece which permitted close estimates of the actual included angle of the diamond. Three areas 2 × 2 inches having a common center were ruled each containing 200 grooves spaced 0.01 inches ± $1\mu$ apart center-to-center. The grooves in each set were parallel to each other but were inclined at 60° to the grooves belonging to each of the other two sets. Optical inspection at 60× showed that the faces of the pyramids appeared as though polished, the tips of the pyramids appeared to be exceedingly sharp, the inclined edges of the pyramids were sharp and free from burrs, and the bottoms of the grooves appeared to be line-like sharp.

Employing special apparatus assembled for the purpose, the beam from a 1 mw He-Ne laser was directed at the face of the ruled master which could be oriented at will in a reproducible fashion by means of two rotary indexing tables, one horizontal and one vertical. In each corner of each ruled square, there are small areas containing only single grooves. By directing the laser beam at these areas, it was possible to obtain numerical values for the following types of angular settings:

a. the one where the beam is normal to the unruled land between the grooves (the plane of the work);
b. the one where the beam is normal to one set of groove faces;
c. the one where the beam is normal to the other set of groove faces.

In all cases, diffraction patterns of the various single gratings were formed, and it was necessary to set the zero order of each pattern on the index line which was the incident laser beam itself. Setting (a) gives the zero position. Settings (b) and (c) give values for ($90 - \beta_1$) and ($90 - \beta_2$) where $\beta_1/2$ and $\beta_2/2$ are the actual half angles of the groove measured relative to the normal to the grating. The sum of ($\beta_1/2 + \beta_2/2$) is the actual included angle ($\beta$) of the groove, and ($\beta_1/2 - \beta_2/2$) gives the angle between the bisectrix of the groove and the normal to the unruled surface. The apparatus employed permits the measurements of these angles to within ± 18 seconds of arc ≡ ± 0.3 minute of arc. For each square ruled area, these three angular settings were made in duplicate at the upper left and upper right corner of each square with the grooves in each case aligned so as to be vertical. It was found that the maximum departure of $\beta$ from the value (70°31.7' + 2.8') desired was + 2 minutes of arc, the average value being + 1.8 minutes. The maximum departure and average value for the angle between the bisectrix of the angle and the normal to the plane of the grating were both equal to —, or less than, ± 18 seconds of arc ≡ ± 0.3 minute of arc, the minimum value readable with the apparatus employed.

From this aluminum ruled master were made four one-step replicas by procedures regularly employed for replicating ruled diffraction gratings for use in optical instruments (spectrometers, spectrographs and such). The replicas are supported by KOVAR (Fe-Ni-Co) alloy plates having low thermal coefficient of expansion which has been ground flat on one face. The front surfaces of the replicas contain air-filled c.c. mirrors (evaporated gold, aluminum, or chromium), and these metal films are bonded to the metal backing by a thin layer of filled epoxy resin which also fills the space about 0.005 inch thick from the tops of the pyramids to the bottoms of the grooves normally "filled " by air in the case of the ruled master. The air-metal surfaces of the c.c. mirrors were at one time separated from the surfaces of the pyramids only by a monomolecular film of separatrix. Although it is true that the filled epoxy employed has a volume shrinkage of about 1.6 percent on curing, if such shrinkage is uniform, it follows that the angles possessed by the pyramids should be retained by the c.c. mirrors, and these replicas should represent about the most accurate replica which could be made from such a ruled master grating or grid.

Employing the same special apparatus and method applied to the ruled master for measuring groove angles, a similar evaluation was made for the evaporated gold replica. In the one-step replicas, what formerly were single grooves going below the unruled land between grooves in the master now become v-shaped ridges protruding above the surface of the metal back-up blank. However, measurements of the same type are possible, and it was found that the errors in $\beta$, the included angle of the grooves, were the same as those on the master to within $\pm 10\%$ and that the bisectrix of the groove angles were also, as in the master, the minimum value readable, namely, $\pm 0.3'$ of arc.

In a crude initial test using a flashlight and a viewing distance of only 10–12 feet it was noted that the aluminized replica was highly retroreflective and, at this viewing distance, appeared to be "brighter" than a beaded commercial product of high quality which was intended for uses involving large viewing distances.

The red light from a 1 m. amp. He-Ne laser was directed perpendicular to the surface of the replica having the c.c. mirrors coated with evaporated gold. The distance from the laser to the grating was 1 meter. A white, opaque screen was placed right in front of the laser and was provided with a small hole to allow the beam to pass from laser to grating. At this working distance, with no lenses involved, the diameter of the beam at the grating was about 2 mm. and from the value for the area $(0.037 \text{ mm}^2)$ of one triangular window it is calculated that about 72 c.c. mirrors were filled by the beam. The pattern of retroreflected light was viewed on the white screen back at the laser and was seen to consist of two six-pointed stars rotated by 30° relative to one another. The individual spots seen in FIGS. 8 and 9 were not visible as such because the spots had now become sufficiently diffuse to merge into one another. The tightness of the diffraction pattern was excellent and, qualitatively, the bulk of the reflected light was close to the axis thus lending support to the accuracy of the measurements of groove angles made previously. A thin plane-parallel plate of glass, aluminized on one surface so as to have a reflection coefficient of 0.5 for light of wave length $0.633\mu$ was placed in front of the grating at 45° to the laser beam. Using a detector of CdS capable of accepting light in a solid angle of radius 15°, and interposing calibrated neutral density filters where necessary, the detector signals were measured for 50 percent of the input light, off to one side of the laser beam, and for 50 percent of the retroreflected light, off to the other side. The ratio of these signals was 0.8 thus indicating that 80 percent of the incident light was reflected inside a cone-shaped solid angle having a radius of 15°. (The reflection coefficient of evaporated gold at this wave length is 0.94, and $0.94^3 = 0.83$; thus, a minimum of $0.8/0.83 \approx 96$ percent of the retroreflected light was accounted for.) Leaving the partially reflecting mirror fixed, the retroreflected pattern was intercepted by an aperture having a diameter of 3.0 cm. at a distance of 100 cm. from the replica. The signal was measured by a red-sensitive detector having a detector area 4.0 cm. in diameter. The ratio of this signal to that of the input light was 0.72 thus indicating that 72 percent of the incident red light is retroreflected inside a cone-shaped solid angle having a semi-angle of divergence of 0.015 radian (0.86°).

The next experiment involved quantitative photometric measurements by means of which the performance of an evaporated Al c.c. replica was compared with that of a commercially acceptable sample of retroreflective beaded product. As made, the c.c. mirror cavities of the replica are filled with air. Therefore, by careful spraying, the cavities were filled with a colorless, transparent resin having a refractive index of $\approx 1.5$ for yellow-green light, and the outer surface was then polished on a cloth lap using Mg O powder plus water. Both samples were masked with dull black paper so that equal areas (1 × 1 inch) of each were employed. The measurements were made at a working distance of 100 feet employing a parallel beam of white light as the source and a photomultiplier as the detector. Two different values were involved for the angle, $0.2°(3.5\times10^{-3}$ rad.) and $0.5°$ $(8.7\times10^{-3}$ rad.), between the outgoing and returning beams at the source detector end, and for each of these, four different angles of incidence (0°, 15°, 30°, and 45°) between the incident beam and the normal to the retroreflective array were used. As could be anticipated from the high retroreflective efficiency of the research type c.c. replica, its performance under all conditions was superior to that of the commercial beaded product by a factor of $\approx 2.5\times$ for all angles of incidence. In addition, at angles of incidence as large as 70°, the c.c. replica with plastic-filled c.c. aluminized mirrors still possessed practically useful retroreflective efficiencies about 25 percent and 15 percent of the values at 0° angle of incidence when the detector was used off-axis by the angles 0.2° and 0.5°, respectively; at such an extreme angle of incidence, the beaded product gave very poor performance.

The one-step replica described in the foregoing example with aluminized mirror surfaces on the faces of the c.c. cavities and with the cavities filled with a colorless, optically transparent, optically homogeneous medium so as to provide a smooth front surface constitutes a complete embodiment of the invention.

Another suggested means for reproducing the reflective surface is to make a drum roller with the precision pyramid surface described in Example 1 and then use the drum to emboss the c.c. cavity pattern continuously in the surface of a continuous sheet or plate of plastic material such as polymethylmethacrylate, polycarbonate, cellulose acetate, polystyrene, ABS resin, silicones, polyvinyl resins and the like. In such embossing operations it will be necessary to reproduce the retroreflective pattern with fine mechanical precision. The embossed sheet or plate is then mirror finished and used for making whatever reflective devices are ultimately intended such as reflective signs, markers and the like. In another embossing process the cavity pattern can be impressed in a thin foil of metal such as aluminum or stainless steel or tin alloyed with antimony which is sufficiently workable so that it can be drawn so as to conform to the precision pattern by embossing. This usually would be done with the foil sheet mounted on a deformable, non-elastic backing such as high-density foamed materials made of polyurethane, glass, metal, or the like.

Still another and simpler variation of the preceding embodiment would involve a die containing a flat array of trigonal pyramids used as a "stamper." This variation would also include embossing operations in plastic "globs," plastic sheet, or metal foils and generally, but not always, would require heat and pressure. Such operations can be continuous (as in a modern newspaper press) but are generally intermittent. If the thickness of the finished material (foil or plastic) were specified as being, say 0.001 inch, matching male and female dies could be employed and kept "in register" by precision guides. This approach would not require the use of a crushable substrate.

Additional embodiments also include the use of casting and spraying procedures followed by stripping or parting, batch electrolysis, and continuous electrolysis with continuous stripping on a rotating drum containing the trigonal pyramids.

Although the techniques discussed have all revolved around the making of c.c. cavities from solid trigonal pyramids, the possibility of making transparent c.c. prisms with triangular windows projecting outwardly from a transparent, colorless, or colored plastic sheet is also contemplated, and after completion, the three exposed prism faces would be aluminized and then covered in order to increase the angles of incidence through which the array would be retroreflective. (Refer to FIG. 2.)

The method of ruling grooves in a prescribed manner with a v-shaped tool of prescribed angle which automatically generates thousands of trigonal pyramids of identical size and shape possessing internal dihedral angles of 90° can also be employed in a manner such that errors in the 90° angles of known amounts can be introduced deliberately between one pair, two pairs, or three pairs of sides in the trigonal pyramids. This in turn will produce similar errors in the 90° dihedral angles of the c.c. mirrors or c.c. prisms made from the ruled master by replication. Still further, this can alter the pattern of the retroreflected light so that the brightest part of the pattern will no longer be at the light source but, instead, can be made to be off axis by the amount desired at a certain viewing distance. (Such a thing is not possible with retroreflectors employing circular apertures.) The variety of patterns achieveable include the following types:

a. One 90° angle off (either too tight or too slack), two 90° angles correct. This will produce two beams off axis in a "dumbbell" pattern symmetrical with respect to the optic axis. These two beams could be made to be horizontal, vertical, or inclined to the horizontal or vertical directions at the angle desired.

b. One 90° angle correct, two 90° angles off (one too tight and one too slack, or both too tight or too slack). This will produce four exit beams lying at the corners of a rhombus symmetrically disposed relative to the axis.

c. All three 90° angles off by as much as ± 2°; there are numerous combinations possible here:

c-1. All angles too tight or too slack by equal or unequal amounts. This will produce six beams off axis at the vertices of a regular or deformed hexagon.

c-2. One angle too tight (or too slack), the other two angles too slack (or too tight) by equal or unequal amounts. If the departures from 90° are equal, there will be five exit beams, two of which will be on axis, the other four being at the corners of a rectangle. If unequal, the six exit beams will all be off axis but, when taken in pairs, will be symmetrically disposed relative to the optic axis. The article by P. R. Yoder, Jr., in J. Opt. Soc. Am. 48, 496–499 (1958) gives some information regarding the relationships existing between the errors in the 90° angles and the deviations from parallelism for the retroreflected rays.

If procedures are to be employed which are designed to introduce errors in the 90° dihedral angles of the pyramids generated by ruling, then it must be admitted that certain types of errors are more or less desirable than others. In generating pyramids to be employed for giving a retroreflected diffraction pattern possessing characteristics so as to provide optimum viewing at some specific distance between the source and the apertures, it is seen that one desirable type of error to make is the one which will generate two 90° angles essentially correct and one 90° angle in error. This can be done so as to produce very little light on-axis at the source and two retroreflected beams spread out horizontally and symmetrically disposed relative to the optic axis. In the case of a movie or slide projector with only one light source there will be two returning beams and two overlapping diffraction patterns. In those cases where there are two sources (automobile headlights), there will be four returning beams and four overlapping diffraction patterns. By establishing the angular distribution of the illumination levels in the diffraction pattern of one beam it is then possible to calculate the extent of error in one 90° angle required to produce a greater level of illumination at the eye at a given viewing distance from the four overlapping diffraction patterns. An error in one 90° angle can be produced by ruling the first two sets of grooves slightly greater (or slightly less) than the correct groove angle and then ruling the third set of grooves with a groove angle slightly less (or slightly greater) than the correct value. This is so because the first two sets of grooves establish two opposite dihedral angles of the four-sided pyramids generated by the first two sets of grooves; the final set of grooves splits the four-sided pyramids in half to give trigonal pyramids and establishes the remaining two dihedral angles for each trigonal pyramid. The maximum error in one 90° angle would be ± 2°.

Another type of ruling error which conceivably could lead to improved results would be one in which two 90° angles are incorrect by essentially the same amount (both too slack or too tight) with the third angle being correct. This would split each returning beam into four beams and would generate eight overlapping diffraction patterns from two sources. These deliberate errors can be achieved by ruling the first two sets of grooves with the correct angle and the third set of grooves with an angle that can be either too tight or too slack. Each pyramid will then have one angle 90° and the other two incorrect by the same amount. The maximum errors in two 90° angles would be ± 2°.

In the first case (only one angle incorrect), an error of 6.7 minutes of arc in one 90° angle would be required to move the centers of the retroreflected beams (two for each source) off-axis by half the source-to-source spacing. (We assume a viewing distance of 500 feet, a headlight separation of 57 inches, and that the c.c. prisms or mirrors have an index of 1.5.) In the second case (two angles incorrect by the same amount as before, 6.7 minutes of arc), for each source, two of the returning beams would be off-axis by the same amount as before (half the source-to-source separation) while the remaining two would be off-axis by an additional factor of 1.732 times the displacements of the other two beams and in a line at right angles to the line connecting the other two displaced beams.

It has been stated that one objective is to make retroreflective sheet material that is thin. This means that the cube corners must be small; this, it has been seen, produces considerable angular divergence by diffraction effects alone. Thus, in a case where it is not possible to control the ruling according to the prescribed fashion, the errors in the 90° dihedral angles will produce additional angular divergence over and above that produced by diffraction alone so that the total is excessive. For this reason, it may be desirable to have a means available for contracting the cone of retroreflected light so as to negate the unwanted excessive angular divergence. This can be achieved by employing a tool with curved instead of straight cutting edges. The curvature of these cutting edges should be concave outwards so as to impart focusing properties to the end product formed be it c.c. mirrors or c.c. prisms. In those cases in which large viewing distances (200 to 500 feet) are involved, this can be accomplished by having the c.c. mirrors or c.c. prism faces concave towards the light source and having radii of curvature less than 400 feet, and in some cases, in the neighborhood of 200 feet. To achieve this, the tool employed for generating the trigonal pyramids should have both cutting edges concave outwards and should possess approximately equal radii of curvature less than 400 feet, and in some cases, in the neighborhood of 200 feet. The outermost surface of transparent material which is exposed to the air should be flat or else be convex outward with a radius of curvature less than 400 feet.

I claim:

1. A retroreflector constructed so that diffraction is a dominant factor governing the angular divergence of retroreflected light from perfect retroreflection, said retroreflector consisting essentially of a hexagonal close packed array of contiguous cube corners having windows which are equilateral triangles defined at the intersecting boundaries of respective contiguous cube corners in said array by three sets of continuous parallel lines all oriented in a plane with included angles of 60° between respective lines of each such set at a common point of intersection, said cube corners each having three adjacent faces intersecting at dihedral angles of 90° ± 2.8 minutes of arc, the respective adjacent lines in each such three sets of parallel boundary lines being all equally spaced apart with normal spacing in the range from 15.5 to 830 microns between adjacent lines of each set, said normal spacing of parallel lines being a value within the defined range selected to produce a desired angular divergence of the retroreflected light due to diffraction, and the faces of said cube corners all being essentially specular mirror surfaces having reflective coefficients of at least 0.6.

2. A retroreflector defined by claim 1 wherein the defined array of cube corners is defined as cavities in the surface of a thin sheet of plastic resin material.

3. A retroreflector defined by claim 1 wherein the defined array of cube corners is defined as cavities in a metal surface.

4. A retroreflector defined by claim 1 wherein the defined array of cube corners are cavities filled with optically transparent solid material.

5. A retroreflector defined by claim 1 wherein the defined array of cube corners consists of transparent cube corner prisms formed in and projecting from the back of a sheet of transparent sheet material.

6. A retroreflector defined by claim 5 having the faces of the defined prisms in contact with air and the prisms being retroreflective by total internal reflection.

7. A retroreflector defined by claim 5 having the outer prism surfaces coated with evaporated metal mirror coating and a protective covering.

8. A retroreflector defined by claim 1 wherein the defined normal spacing between parallel boundary lines is about 254 microns.

9. A retroreflector defined by claim 1 wherein the defined specular reflective coefficient of each mirror surface is about 0.9.

10. A retroreflector defined by claim 1 wherein each cube corner face in the array is cylindrically concave outward between base and apex with radius of curvature less than 400 feet.

11. A retroreflector defined by claim 10 wherein the defined radius of curvature is about 200 feet.

12. A retroreflector defined by claim 3 wherein the front surface of plastic material through which incident and retroreflected light are transmitted and refracted, forms a spherical convex lens surface having radius of curvature less than 400 feet.

13. A retroreflector defined by claim 12 wherein the defined radius of curvature is about 200 feet.

14. A retroreflector constructed so that diffraction is a dominant factor governing the angular divergence of retroreflected light from perfect retroreflection, said retroreflector consisting essentially of a hexagonal close packed array of contiguous cube corners having windows which are equilateral triangles defined at the intersecting boundaries of respective contiguous cube corners in said array by three sets of continuous parallel lines all oriented in a plane with included angles of 60° between respective lines of each such set at a common point of intersection, said cube corners each having three adjacent faces intersecting at dihedral angles two of which are 90° ± 2.8 minutes of arc and the other is 90° ± 2°, the respective adjacent lines in each such three sets of parallel boundary lines being all equally spaced apart with normal spacing in the range from 3.5 to 250 microns between adjacent lines of each set, said normal spacing of parallel lines being a value within the defined range selected to produce a desired angular divergence of the retroreflected light due to diffraction, and the faces of said cube corners all being essentially specular mirror surfaces having reflective coefficients of at least 0.6.

15. A retroreflector constructed so that diffraction is a dominant factor governing the angular divergence of retroreflected light from perfect retroreflection, said retroreflector consisting essentially of a hexagonal close packed array of contiguous cube corners having windows which are equilateral triangles defined at the intersecting boundaries of respective contiguous cube corners in said array by three sets of continuous parallel lines all oriented in a plane with included angles of 60° between respective lines of each such set at a common point of intersection, said cube corners each having three adjacent faces intersecting at dihedral angles one of which is 90°± 2.8 minutes of arc and the other two are 90° ± 2.0°, the respective adjacent lines in each such three sets of parallel boundary lines being all equally spaced apart with normal spacing in the range from 3.5 to 250 microns between adjacent lines of each set, said normal spacing of parallel lines being a value within the defined range selected to produce a desired angular divergence of the retroreflected light due to diffraction, and the faces of said cube corners all being essentially specular mirror surfaces having reflective coefficients of at least 0.6.

16. A retroreflector constructed so that diffraction is a dominant factor governing the angular divergence of retroreflected light from perfect retroreflection, said retroreflector consisting essentially of a hexagonal close packed array of contiguous cube corners having windows which are equilateral triangles defined at the intersecting boundaries of respective contiguous cube corners in said array by three sets of continuous parallel lines all oriented in a plane with included angles of 60° between respective lines of each such set at a common point of intersection, said cube corners each having three adjacent faces intersecting at dihedral angles of 90° ± 2°, the respective adjacent lines in each such three sets of parallel boundary lines being all equally spaced apart with normal spacing in the range from 3.5 to 250 microns between adjacent lines of each set, said normal spacing of parallel lines being a value within the defined range selected to produce a desired angular divergence of the retroreflected light due to diffraction, and the faces of said cube corners all being essentially specular mirror surfaces having reflective coefficients of at least 0.6.

* * * * *

UNITED STATES PATENT OFFICE
CERTIFICATE OF CORRECTION

Patent No. 3,712,706     Dated January 23, 1973

Inventor(s) ROBERT FRANZ STAMM

It is certified that error appears in the above-identified patent and that said Letters Patent are hereby corrected as shown below:

Abstract, fifth line, read -- that -- instead of "teat".

Column 2, line 46, read -- lines -- instead of "line".

Column 6, line 68, read -- text -- instead of "test".

Column 7, line 68, read -- $10^{-2}$ -- instead of "$10^{116}$ 2".

Figure 4:
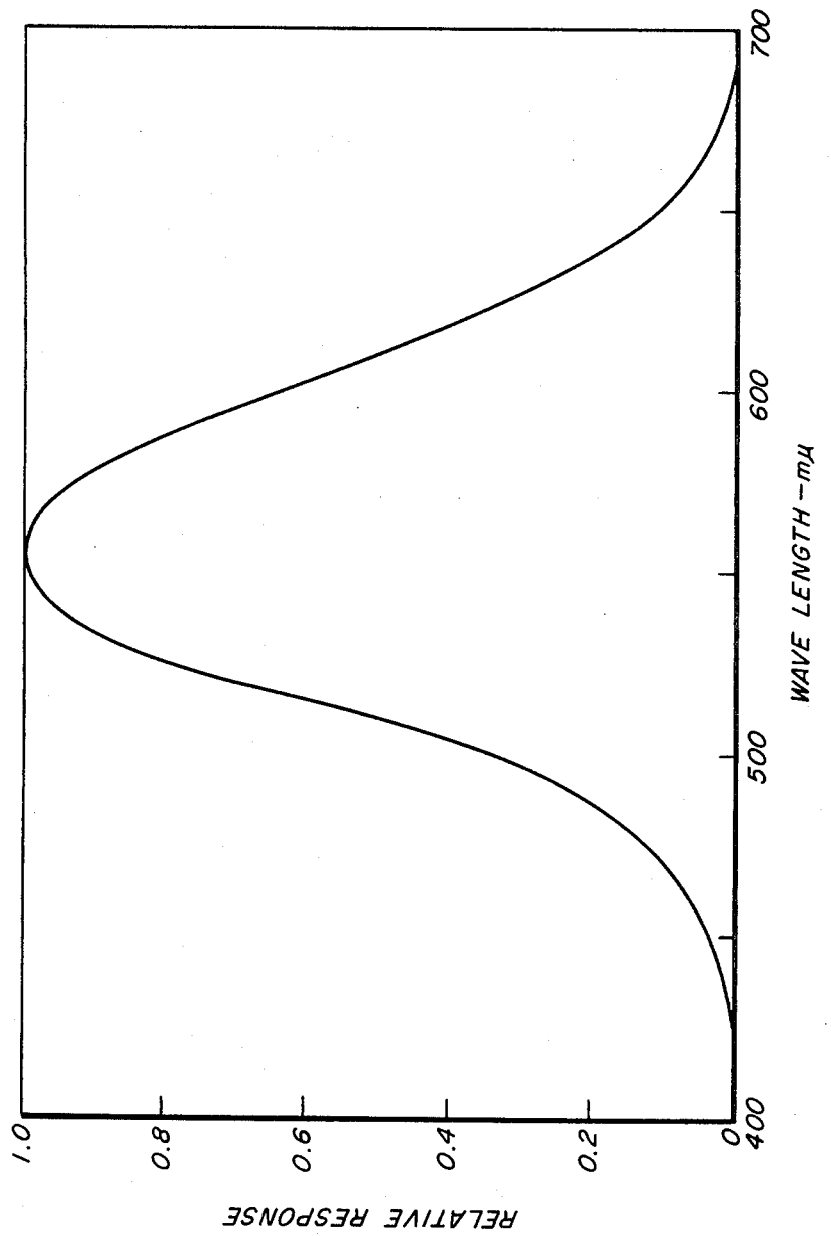
FIG. 4 is the known photopic curve showing relative sensitivity of the human eye to monochromatic light at wavelengths from 400 to 700 millimicrons.
Figure 5:
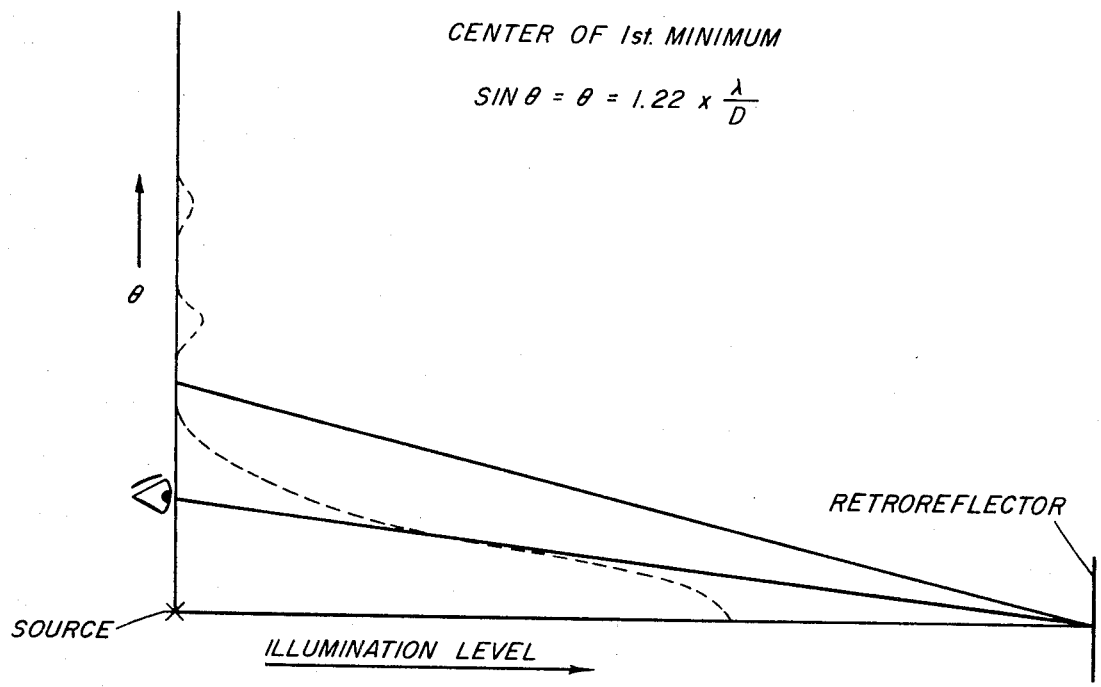
FIG. 5 is a graph showing the angular dependance of the illumination level of retroreflected light in the diffraction pattern formed by a circular aperture.

Column 8, line 16, read -- micron -- before "illustrated in Fig. 4" instead of after that phrase.

Column 9, line 53, read -- 4" x 5" -- instead of "4 x 5".

Column 12, line 56, read -- x -- instead of " = ", both before and after the second parenthetic expression in the formula.

Column 13, line 61, read -- $\sqrt{3}/2$ -- instead of "$\sqrt{3/2}$".

Column 17, line 4, read -- $(1/3)h \div (\sqrt{2}/3)h$ -- instead of "$(1/3)h(\sqrt{2/3})h$".

Column 17, line 5, read -- $\sqrt{2}/2$ -- instead of "$\sqrt{2/2}$".

Column 22, lines 20-23, at each occurrence of "$\beta_1/2$" read -- $\beta_1$ -- instead.

Column 22, lines 20-23, at each occurrence of "$\beta_2/2$" read -- $\beta_2$ -- instead.

Column 22, line 33, read -- $\pm$ 2.8 -- instead of " + 2.8".

Signed and sealed this 19th day of November 1974.

(SEAL)
Attest:

McCOY M. GIBSON JR.
Attesting Officer

C. MARSHALL DANN
Commissioner of Patents

Dedication 3,712,706.—*Robert Franz Stamm*, Stamford, Conn. RETROREFLECTIVE SURFACE. Patent dated Jan. 23, 1973. Dedication filed Oct. 6, 1975, by the assignee, *Reflexite Corporation*.

Hereby dedicates to the Public the remaining term of said patent.

[*Official Gazette March 16, 1976.*]